US006542921B1

(12) United States Patent
Sager

(10) Patent No.: US 6,542,921 B1
(45) Date of Patent: Apr. 1, 2003

(54) METHOD AND APPARATUS FOR CONTROLLING THE PROCESSING PRIORITY BETWEEN MULTIPLE THREADS IN A MULTITHREADED PROCESSOR

(75) Inventor: David J. Sager, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/350,408

(22) Filed: Jul. 8, 1999

(51) Int. Cl.⁷ .............................................. G06F 15/16
(52) U.S. Cl. ....................................... 709/108; 712/228
(58) Field of Search ................................ 709/108, 107; 712/23, 228, 246, 214, 205

(56) References Cited

U.S. PATENT DOCUMENTS

| | | |
|---|---|---|
| 3,771,138 A | 11/1973 | Celtruda et al. |
| 5,357,617 A | 10/1994 | Davis et al. |
| 5,386,561 A | 1/1995 | Huynh et al. |
| 5,404,469 A | 4/1995 | Chung et al. |
| 5,430,850 A | 7/1995 | Papadopoulos et al. |
| 5,499,349 A | 3/1996 | Nikhil et al. |
| 5,524,263 A | 6/1996 | Griffith et al. |
| 5,791,522 A | 8/1998 | Lee et al. |
| 5,809,271 A | 9/1998 | Colwell et al. |
| 5,809,522 A | 9/1998 | Novak et al. |
| 5,892,959 A | 4/1999 | Fung |
| 5,968,160 A | 10/1999 | Saito et al. |
| 5,996,085 A | 11/1999 | Cheong et al. |
| 5,999,932 A | 12/1999 | Paul |
| 6,052,708 A | 4/2000 | Flynn et al. |
| 6,052,709 A | 4/2000 | Paul |
| 6,088,788 A | 7/2000 | Borkenhagen et al. |
| 6,092,175 A | 7/2000 | Levy et al. |
| 6,105,127 A | 8/2000 | Kimura et al. |
| 6,115,709 A | 9/2000 | Gilmour et al. |
| 6,212,544 B1 | 4/2001 | Borkenhagen et al. |
| 6,233,599 B1 * | 5/2001 | Nation et al. ................ 709/102 |
| 6,256,775 B1 | 7/2001 | Flynn |

FOREIGN PATENT DOCUMENTS

| | | |
|---|---|---|
| EP | 346003 A2 | 6/1989 |
| EP | 352935 A2 | 7/1989 |
| EP | 725335 A1 | 1/1996 |
| EP | 747816 A2 | 5/1996 |
| EP | 0768608 A3 | 4/1997 |
| EP | 0768608 A2 | 4/1997 |
| EP | 827071 A2 | 8/1997 |
| EP | 0856797 A1 | 5/1998 |
| EP | 962856 A2 | 5/1999 |
| GB | 2311880 A | 3/1996 |
| WO | WO 99/21082 | 4/1999 |
| WO | WO99/21088 | 4/1999 |
| WO | 99/21089 * | 4/1999 |

OTHER PUBLICATIONS

"Architectural and Implementation Tradeoffs in the Design of Multiple–Context Processors", James Laudon, Anoop Gupta and Mark Horowitz, *Multithreaded Computer Architecture: A Summary of the State of the Art,* chapter 8, pp. 167–200, Kluwer Academic Publishers 1994.

(List continued on next page.)

*Primary Examiner*—Larry D Donoghue
(74) *Attorney, Agent, or Firm*—Blakely, Sokoloff, Taylor & Zafman LLP

(57) ABSTRACT

The present invention provides a method and apparatus for controlling a processing priority assigned alternately to a first thread and a second thread in a multithreaded processor to prevent deadlock and livelock problems between the first thread and the second thread. In one embodiment, the processing priority is initially assigned to the first thread for a first duration. It is then determined whether the first duration has expired in a given processing cycle. If the first duration has expired, the processing priority is assigned to the second thread for a second duration.

33 Claims, 13 Drawing Sheets

OTHER PUBLICATIONS

"Exploiting Choice: Instruction Fetch and Issue on an Implementable Simultaneous Multithreading Processor", Dean M. Tullsen, Susan J. Eggers, Joel S. Emer, Henry M. Levy, Jack L. Lo and Rebecca L. Stammm, *Proceedings of the 23rd Annual International Symposium on Computer Architecture,* May 22–24, 1996, pp 191–202.

"Evaluation of Multithreaded Uniprocessors for Commercial Application Environments", Richard J. Eickemeyer, Ross E. Johnson, Steven R. Kunkel, Mark S. Squillante and Shiafun Liu, *Proceedings of the 23rd Annual International Symposium on Computer Architecture.* May 22–24, 1996, pp 203–212.

"Performance Study of a Multithreaded Superscalar Microprocessor", Manu Gulati and Nader Bagherzadeh, *Proceedings Second International Symposium on High–Performance Computer Architecture,* Feb. 3–7, 1996, pp 291–301.

"A Benchmark Evaluation of a Multi–Threaded RISC Processor Architecture", R. Guru Prasadh and Chuan–lin Wu, *1991 International Conference on Parallel Processing,* pp I–84–I91.

"Multithreading Comes of Age" Peter song, *Microdesign Resources,* Jul. 14, 1997, pp 13–18.

"Instruction Cache Fetch Policies for Speculative Execution", Dennis Lee, Jean–Loup Baer, Brad Calder and Dirk Grunwald, 22nd International Symposium on Computer Architecture, Jun. 1995.

"Multithreading for Rookies", Ruediger R. Asche, http://www.microsoft.com/win32dev/base/threads.htm, Jul. 31, 1998.

Simon W. Moore, *Multithreaded Processor Design,* Kluwer Academic Publishers, 1996.

Avi Mendelson, et al., Design Alternatives of Multithreaded Architecture, International Journal of Parallel Programming, vol. 27, No. 3, 1999, pp 161–193, Plenum Publishing Corp.

Matthew K. Farrens, et al., Proceedings The 18th Annual International Symposium on Computer Architecture, May 27–30, 1991, pp 362–369, Toronto Canada.

Dongwook Kim, Joonwon Lee, Seungkyu Park, A partitioned on–chip virtual cache for fast processors, Journal of Systems Architecture 43, 1997, pp 519–531, Elsevier, South Korea.

Steere D C et al: "A feedback–driven proportion allocator for real–rate scheduling" Third Symposium on Operating Systems Design and Implementation, New Orleans, LA, USA, Feb. 22–25, 1999, pp. 145–158, XP002153159, Operating Systems Review, Winter 1998, ACM, USA ISSN: 0163–5980.

Intel: "P6 Family of Processors—Chapters 1&2", Hardware Developer's Manual, Online!, Sep. 1998, XP002153160, Retrieved from the Internet Nov. 16, 2000.

"Improved Dispatching in a Rendering Context Manager", IBM Technical Disclosure Bulletin, US, IBM Corp. New York, vol. 33, No. 7, Dec. 1, 1990, pp. 131–134, XP000108363 ISSN: 0018–8689.

* cited by examiner

METHOD AND APPARATUS FOR CONTROLLING THE PROCESSING PRIORITY BETWEEN MULTIPLE THREADS IN A MULTITHREADED PROCESSOR

FIELD OF THE INVENTION

The present invention relates generally to the field of multithreaded processing. More specifically, the present invention relates to a method and apparatus for controlling the processing priority between multiple threads in a multithreaded processor.

BACKGROUND OF THE INVENTION

Various multithreaded processor designs have been considered in recent times to further improve the performance of processors, especially to provide for a more effective utilization of various processor resources. By executing multiple threads in parallel, the various processor resources are more fully utilized which in turn enhance the overall performance of the processor. For example, if some of the processor resources are being idle due to a stall condition or other delay associated with the execution of a particular thread, these resources can be utilized to process another thread. A stall condition or other delay in the processing of a particular thread may happen due to a number of events that can occur in the processor pipeline. For instance, a cache miss or a branch misprediction may occur in the execution of an instruction included within a thread that can cause a stall condition or other delay with respect to the execution of that particular thread. Consequently, without multithreading capabilities, various available resources within the processor would have been idle due to a long-latency operation, for example, a memory access operation to retrieve the necessary data from main memory, that is needed to resolve the cache miss condition.

Furthermore, multithreaded programs and applications have become more common due to the support provided for multithreading programming by a number of popular operating systems such as the Windows NT® and UNIX operating systems. Multithreaded applications are particularly attractive in the area of multimedia processing.

Multithreaded processors may generally be classified into two broad categories, fine or coarse designs, based upon the particular thread interleaving or switching scheme employed within the respective processor. In general, fine multithreaded designs support multiple active threads within a processor and typically interleave two different threads on a cycle-by-cycle basis. Coarse multithreaded designs, on the other hand, typically interleave the instructions of different threads on the occurrence of some long-latency event, such as a cache miss. A coarse multithreaded design is discussed in Eickmayer, R., Johnson, R. et al. "Evaluation of Multithreaded Uniprocessors for Commercial Application Environments", *The 23rd Annual International Symposium on Computer Architecture* pp. 203–212, May 1996. The distinctions between fine and coarse designs are further discussed in Laudon, J., Gupta, A. "Architectural and Implementation Tradeoffs in the Design of Multiple-Context Processors", *Multithreaded Computer Architectures: A Summary of the State of the Art*, edited by R. A. Iannuci et al., pp. 167–200, Kluwer Academic Publishers, Norwell, Mass., 1994.

There are some particular issues that arise with respect to the concept of multithreading and multithreaded processor design, especially with respect to the parallel or concurrent execution of instructions. The first issue is generally referred to as a deadlock condition. This condition can occur when each thread needs a resource that is held by another thread in order to proceed and neither thread will release the resource that it has. For example, suppose that thread 1 and thread 2 both need two resources A and B in order to complete their respective execution and make progress. However, suppose that thread 1 has control of resource A and thread 2 has control of resource B and neither thread will release the resource that it has until it gets the other resource to complete its respective execution. In this instance, both threads 1 and 2 will come to a halt because they will not get the resource they need unless there are some interventions to break the deadlock condition. Generally, there are four conditions that co-exist to cause a deadlock situation as described above. These four conditions are mutual exclusion, resource holding, no preemption, and circular wait. In the above example, each of the two threads 1 and 2 mutually excludes the other thread from gaining access to the resource that it is holding. In addition, there is no preemption rule to direct either one of the two threads to give up the resource that it is holding to the other thread. In other words, both of the threads 1 and 2 have equal rights to keep the resource allocated to it. Lastly, both threads 1 and 2 wait for the other resource to be released in a circular manner.

Another similar problem to the deadlock problem is the livelock problem. In general, this problem can arise when two or more threads continuously change their state in response to the changes in the other threads without doing any useful work. This problem generally involves the interleaving of threads in which the threads are not deadlocked but cannot proceed toward completion. This situation can arise when, in the above example, both threads 1 and 2 attempt to release the resource that they are holding but the timing is such that neither of them can gain access to both the resources A and B. This situation is similar to the deadlock situation in that no progress is made by thread 1 or 2 but is different in that neither thread is being blocked by the other thread. Referring to the above example, suppose that both threads 1 and 2, after some interval of time, release the resource that they are holding and are able to gain access to the other resource that they need. In the above example, suppose that thread 1 has released the resource A and now has access to resource B and that thread 2 has released the resource B and now has access to resource A. Unfortunately, both threads 1 and 2 are back to the same problem that they faced earlier because neither thread has access to both resources A and B. Despite the fact that both threads have done something, i.e., releasing the resource that they held earlier and gaining control to the resource that the other thread was holding, both threads 1 and 2 still cannot make any progress because they still need both resources A and B to proceed any further.

As a result, there exists a need to address the problems of deadlock and livelock in multithreaded processors that are designed to execute multiple threads concurrently.

SUMMARY OF THE INVENTION

The present invention provides a method and apparatus for controlling a processing priority assigned alternately to a first thread and a second thread in a multithreaded processor to prevent deadlock and livelock problems between the first thread and the second thread. In one embodiment, the processing priority is initially assigned to the first thread for a first duration. It is then determined whether the first duration has expired in a given processing cycle. If the first duration has expired, the processing priority is assigned to the second thread for a second duration.

BRIEF DESCRIPTION OF THE DRAWINGS

The features and advantages of the present invention will be more fully understood by reference to the accompanying drawings, in which.

DETAILED DESCRIPTION

In the following detailed description numerous specific details are set forth in order to provide a thorough understanding of the present invention. However, it will be obvious to one skilled in the art that the present invention may be practiced without these specific details.

In the discussion below, the teachings of the present invention are utilized to implement a method and an apparatus for controlling the processing priority between threads in a multithreaded processor in order to prevent deadlock and livelock problems. Each of the threads is alternately assigned the processing priority for a sufficient period of time for it to make progress. If a particular thread did not make any progress despite having the processing priority during a previous processing period, it will be given the processing priority for a longer period the next time. The period of time during which each thread is given the processing priority will continue to increase until some progress is made. The teachings of the present invention are applicable to any multithreaded processor that is designed to process multiple threads concurrently. However, the present invention is not limited to multithreaded processors and can be applied to any processor and machine in which resources are shared between tasks or processes.

Figure 1:
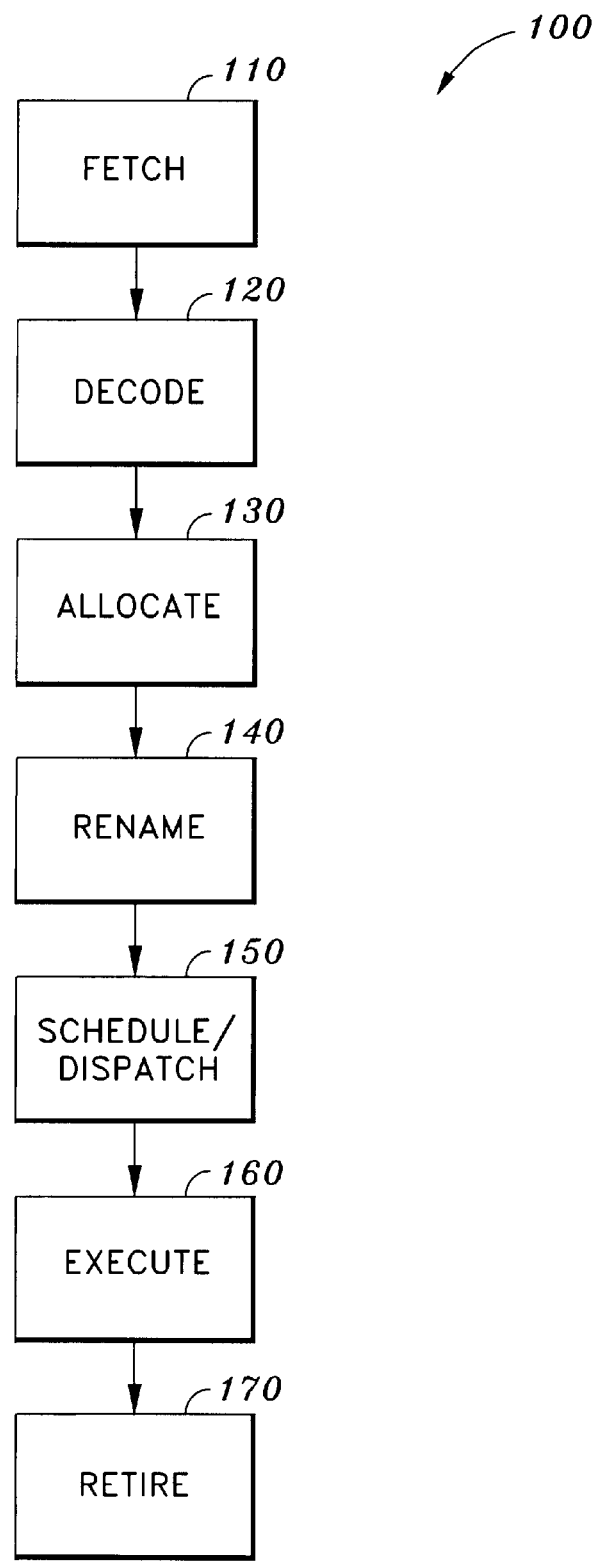
FIG. 1 is a block diagram of one embodiment of a processor pipeline.

FIG. 1 is a block diagram of one embodiment of a processor pipeline within which the present invention may be implemented. For the purposes of the present specification, the term "processor" refers to any machine that is capable of executing a sequence of instructions and shall be taken to include, but not be limited to, general purpose microprocessors, special purpose microprocessors, graphics controller, audio processors, video processors, multi-media controllers and microcontrollers. The processor pipeline 100 includes various processing stages beginning with a fetch stage 110. At this stage, instructions are retrieved and fed into the pipeline 100. For example, a macroinstruction may be retrieved from a cache memory that is integral within the processor or closely associated therewith, or may be retrieved from an external memory unit via a system bus. The instructions retrieved at the fetch stage 110 are then inputted into a decode stage 120 where the instructions or macroinstructions are decoded into microinstructions or micro-operations for execution by the processor. At an allocate stage 130, processor resources necessary for the execution of the microinstructions are allocated. The next stage in the pipeline is a rename stage 140 where references to external registers are converted into internal register references to eliminate dependencies caused by register reuse. At a schedule/dispatch stage 150, each microinstruction is scheduled and dispatched to an execution unit. The microinstructions are then executed at an execute stage 160. After execution, the microinstructions are then retired at a retire stage 170.

In one embodiment, the various stages described above can be organized into three phases. The first phase can be referred to as an in-order front end including the fetch stage 110, decode stage 120, rename stage 130, and allocate stage 140. During the in-order front end phase, the instructions proceed through the pipeline 100 in their original program order. The second phase can be referred to as the out-of-order execution phase including the schedule/dispatch stage 150 and the execute stage 160. During this phase, each instruction may be scheduled, dispatched and executed as soon as its data dependencies are resolved and the necessary execution unit is available, regardless of its sequential position in the original program. The third phase, referred to as the in-order retirement phase which includes the retire stage 170 in which instructions are retired in their original, sequential program order to preserve the integrity and semantics of the program.

Figure 2:
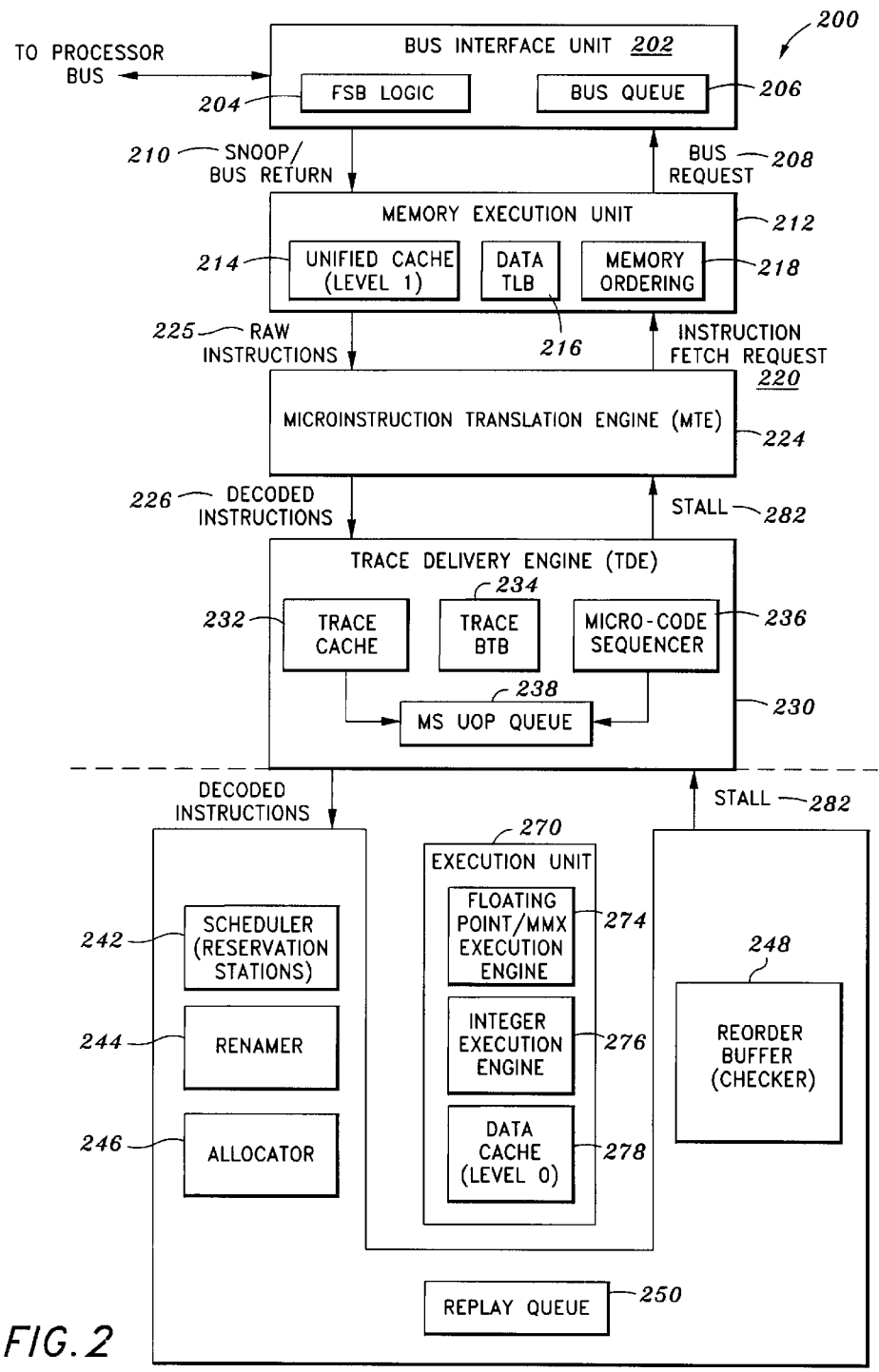
FIG. 2 shows a block diagram of one embodiment of a processor architecture in which the teachings of present invention are implemented.

FIG. 2 is a block diagram of one embodiment of a processor, in the form of a general-purpose microprocessor 200, in which the present invention may be implemented. The microprocessor 200 described below is a multithreaded (MT) processor and capable of processing multiple instruction threads simultaneously. However, the teachings of the present invention described below are fully applicable to other processors that process multiple instruction threads in an interleaved manner and also to single thread processors which have the capabilities to process multiple instructions either in parallel or in an interleaved manner. In one embodiment, the microprocessor 200 may be an Intel Architecture (IA) microprocessor that is capable of executing an Intel Architecture instruction set.

The microprocessor 200 comprises an in-order front end, an out-of-order execution core and an in-order retirement back end. The in-order front end includes a bus interface unit 202 which functions as an interface between the microprocessor 200 and other components (e.g., main memory unit) of a computer system within which the microprocessor 200 may be implemented. The bus interface unit 202 couples the microprocessor 200 to a processor bus (not shown) via which data and control information are transferred between the microprocessor 200 and other system components (not shown). The bus interface unit 200 includes a Front Side Bus (FSB) 204 that controls and facilitates communications over the processor bus. The bus interface unit 202 also includes a bus queue 206 that is used to provide a buffering function with respect to the communications over the processor bus. The bus interface unit 202 receives bus requests 208 from a memory execution unit 212. The bus interface unit 202 also sends snoops or bus returns to the memory execution unit 212.

The memory execution unit 212 is structured and configured to function as a local memory within the microprocessor 200. The memory execution unit 212 includes a unified data and instruction cache 214, a data Translation Lookaside Buffer (TLB) 216, and a memory ordering logic 218. The memory execution unit 212 receives instruction fetch requests 220 from a microinstruction translation engine (MITE) 224 and provides raw instructions 225 to the MITE 224. The MITE 224 decodes the raw instructions 225 received from the memory execution unit 212 into a corresponding set of microinstructions, also referred to as micro-operations. Decoded microinstructions 226 are sent by the MITE 224 to a trace delivery engine (TDE) 230.

The trace delivery engine 230 functions as a microinstruction cache and is the primary source of microinstructions for a downstream execution unit 270. The trace delivery engine 230 includes a trace cache 232, a trace branch predictor (BTB) 234, a micro-code sequencer 236, and a micro-op (uop) queue 238. By having a microinstruction caching function within the processor pipeline, the trace delivery engine 230 and specifically the trace cache 232 can leverage the work done by the MITE 224 to provide a relatively high microinstruction bandwidth. In one embodiment, the trace cache 232 may comprise a 256 entry, 8 way set associate memory. The term "trace", in one embodiment, refers to a sequence of microinstructions stored within the entries of the trace cache 232 with each entry having pointers to preceding and proceeding microinstructions in the trace. Therefore, the trace cache 232 can facilitate high-performance sequencing in that the address of the next entry to be accessed to obtain a subsequent microinstruction is known before a current access is completed. The trace cache branch predictor 234 provides local branch predictions with respect to traces within the trace cache 232. The trace cache 232 and the microcode sequencer 236 provide microinstructions to the micro-op queue 238.

The microinstructions are then fed from the micro-op queue 238 to a cluster that includes a scheduler 242, a register renamer 244, an allocator 246, a reorder buffer 248 and a replay queue 250. The scheduler 242 includes a set of reservation stations and operates to schedule and dispatch microinstructions for execution to the execution unit 270. The register renamer 244 converts references to external registers into internal register references to remove dependencies caused by register reuse. The allocator 246 operates to allocate resources that are required for the execution of the microinstructions. In the event that the required resources are insufficient or unavailable to process a microinstruction or a set of microinstructions, the allocator 246 will assert a stall signal 282 that is propagated to the trace delivery engine 230 and the microinstruction translation engine 224. The replay queue 250 is used to store and provide those microinstructions that need to be re-executed to the execution unit 270. The reorder buffer 248 is used to store the microinstructions in their original, sequential program order. When the microinstructions stored in the reorder buffer 248 have completed execution and are ready for retirement, they are removed from the reorder buffer in their original, sequential program order.

The execution unit 270 includes a floating point execution engine 274, an integer execution engine 276, and a level 0 data cache 278. In one embodiment in which the microprocessor 200 executes the IA instruction set, the floating point execution engine 274 may also execute MMX® instructions.

Figure 3:
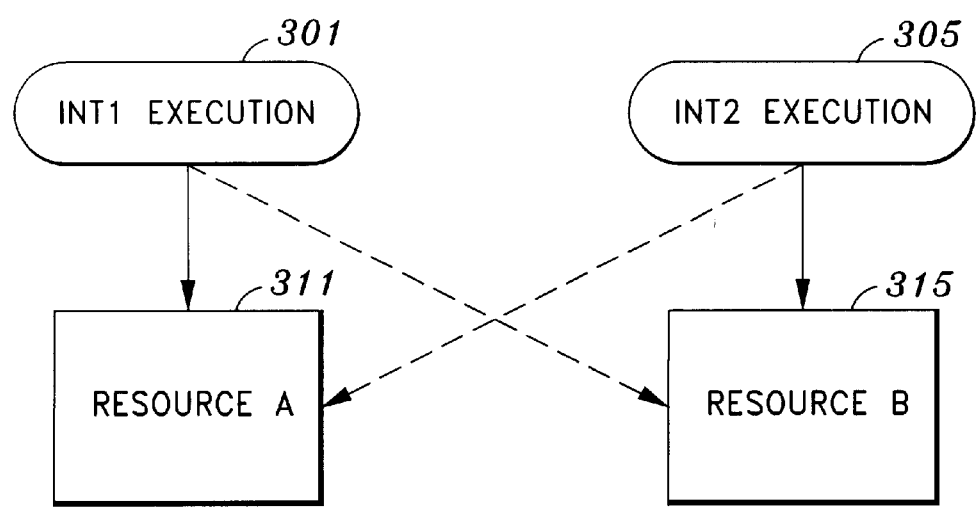
FIG. 3 shows an example of a deadlock problem.

FIG. 3 shows an example of a deadlock situation that can occur in a multithreaded processor. In this example, it is assumed that there are two threads, thread 0 and thread 1, that are being executed concurrently by the multithreaded processor. It is further assumed that two resources A 311 and B 315 are required to execute one instruction, INT1 301, in thread 0 and another instruction, INT2 305, in thread 1. Since the two threads 0 and 1 are being executed concurrently, it is possible that INT1 301 and INT2 305 are to be executed at the same time. Suppose that resource A 311 is allocated to thread 0 and resource B 315 is allocated to thread 1. Consequently, the execution of instruction INT1 301 in thread 0 cannot be completed because the other resource, i.e., resource B 315, which is required for the execution of instruction INT1 301 is already being allocated for the execution of instruction INT2 305 in thread 1. Similarly, the execution of instruction INT2 305 in thread 1 cannot be completed either because the other resource, i.e., resource A 311, which is required for the execution of instruction INT2 305 is already allocated to thread 0. As a result, neither thread 0 nor thread 1 can proceed any further. This is one of the classic deadlock situations that can arise in a multithreading environment. The deadlock situation described above can also occur in a single thread environment where multiple instructions within a single thread are executed concurrently.

Figure 4:
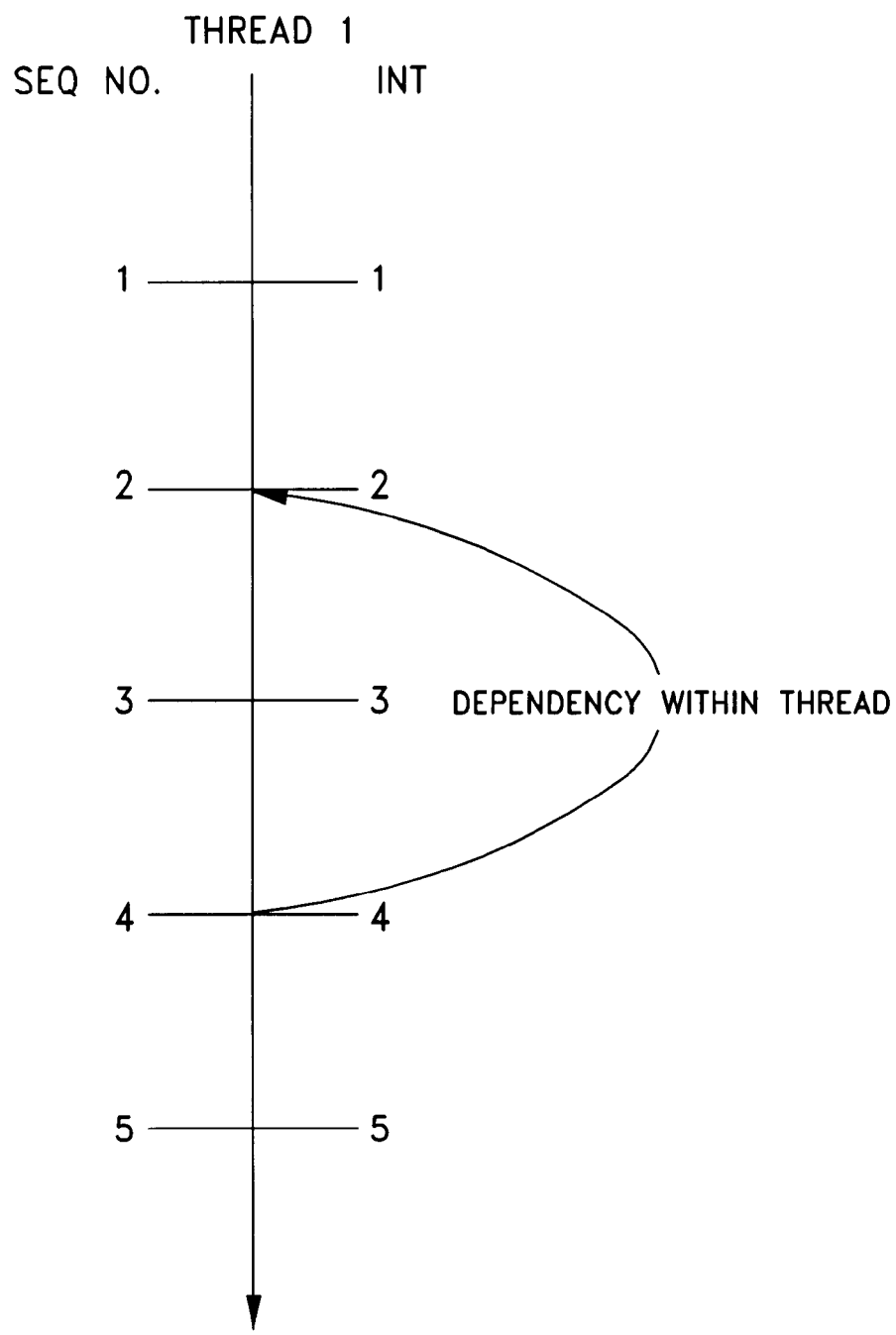
FIGS. 4 and 5 show an example of a livelock problem.
Figure 5:
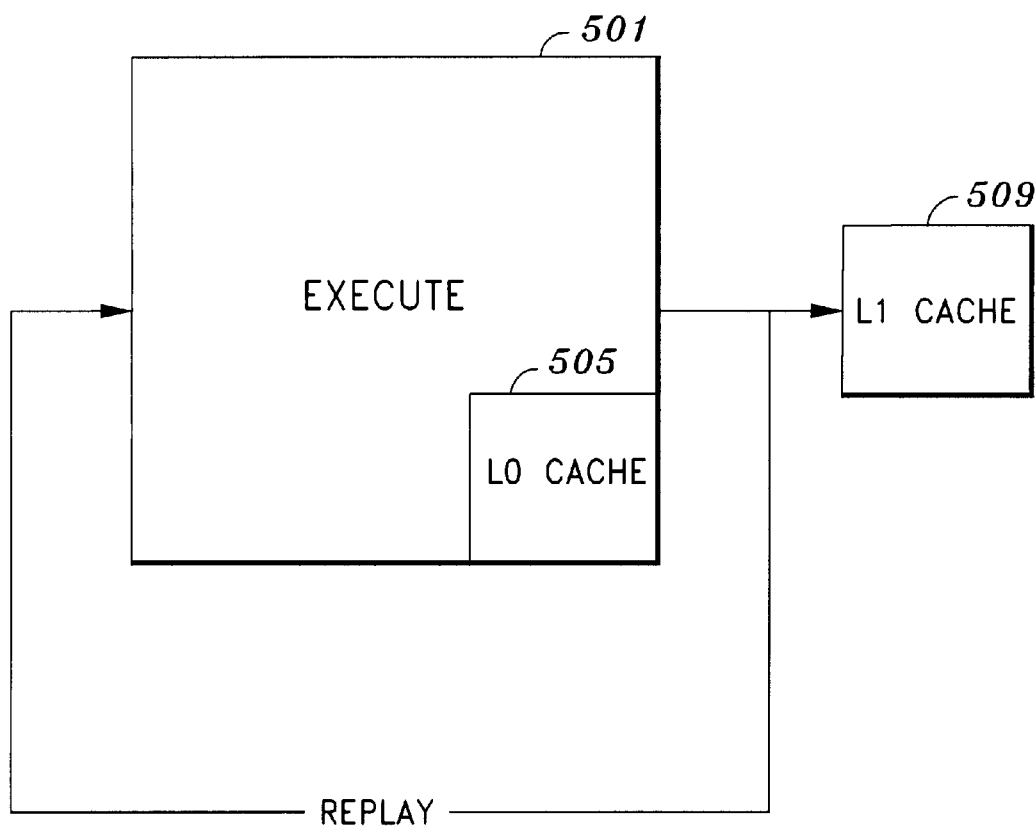

FIGS. 4 and 5 show an example of a livelock situation that can occur in either a multithreading environment or in a single threading environment where instructions in a given thread are executed out of order, i.e., in an order that is different than their original program order. In this example, it is assumed that one thread, for example, thread 1 contains multiple instructions, INT1–INT5 and that the execution of these instructions can be out-of-order. It is further assumed that instruction INT4 depends on instruction INT2. It logically follows that the execution of instruction INT4 cannot be completed unless and until the execution of instruction INT2 has been completed. Because of the out-of-order instruction execution scheme, it is possible that instruction INT4 may be executed first or at the same time as instruction INT2.

As stated earlier, since instruction INT4 logically depends on instruction INT2, it is likely that instruction INT4 gets executed again or replayed because the execution of instruction INT2 has not yet been completed at the time instruction INT4 first gets executed. However, assuming in this example that the first execution of instruction INT4 results in a level 0 cache miss causing a level 1 cache look-up operation to be performed which makes the level 1 cache busy. It is supposed also that the first execution of instruction INT2 also results in a level 0 cache miss causing another level 1 cache look-up operation to be performed. Unfortunately, in this example, the timing of the level 1 cache look-up operation is such that the level 1 cache is still busy serving the request for instruction INT4 at the time the look-up request for instruction INT2 is initiated. As a result, the level 1 cache look-up request for instruction INT2 gets ignored. Because the execution of instruction INT2 on which instruction INT4 depends cannot be completed until instruction INT2 obtains the data it needs from the level 1 cache, instruction INT4 cannot be retired and has to be re-executed. Assuming further that the timing of the second execution of instruction INT4 is such that it will again makes the level 1 cache busy at the time instruction INT2 needs to access the level 1 cache to obtain the data needed. Consequently, both instructions INT2 and INT4 go in a circle of re-executions without getting completed.

In a single thread environment, this livelock situation can be detected and resolved by monitoring the progress of the single thread being executed and taking appropriate actions if there is no progress made after some predetermined period of time. For example, if there is no instruction retired after a predetermined number of processing periods or clock cycles, it is possible that a livelock situation as described above has occurred. In this case, one possible solution to resolve the livelock situation is to execute the instructions in-order so that the logical dependencies between the different instructions are satisfied. Thus in the present example, instruction INT2 will get executed before instruction INT4 which will satisfy the logical dependency between instructions INT4 and INT2. As mentioned above, the sequence number assigned to each instruction will be used to perform an in-order instruction execution, if necessary. The sequence number assigned to each instruction corresponds to the logical sequence of each instruction in its original program order.

Figure 6:
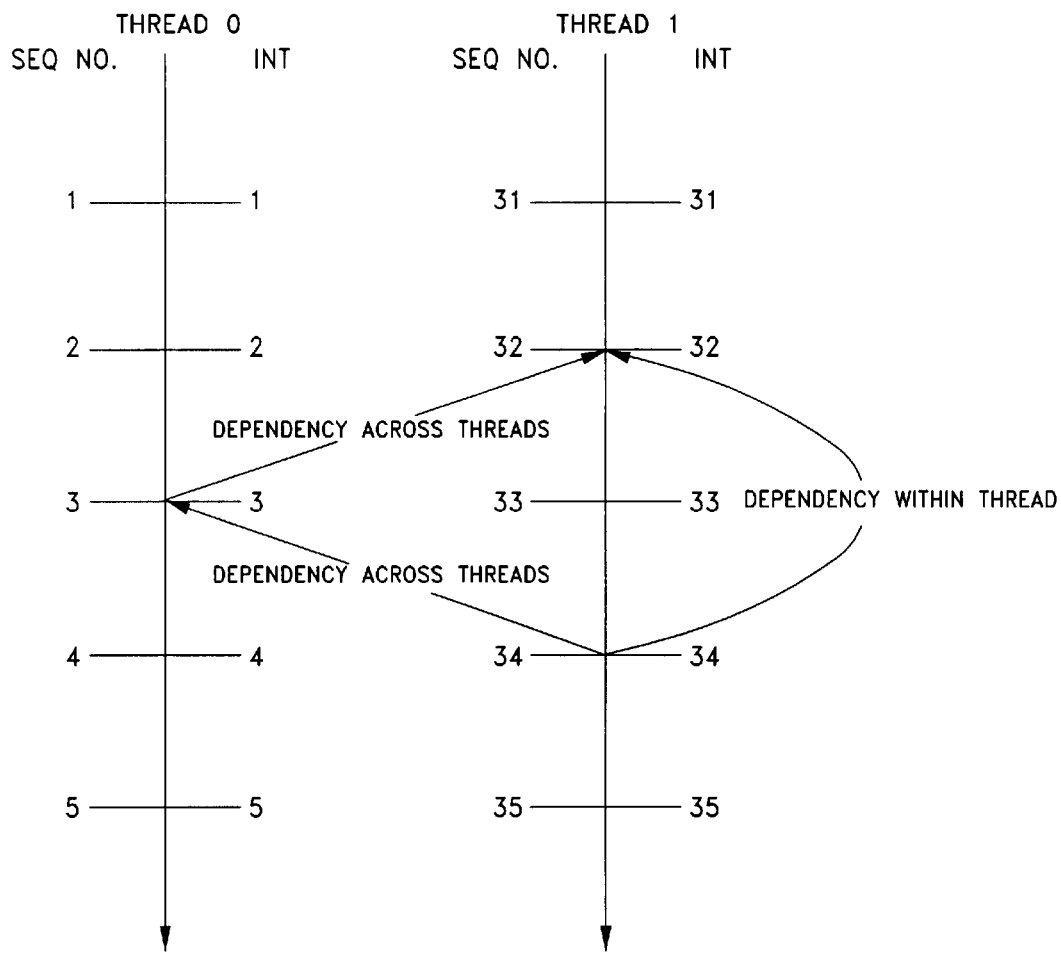
FIG. 6 illustrates an example of a livelock problem in a multithreading environment.

FIG. 6 illustrates another problem that can arise in a multithreading environment. For clarity and simplicity, the discussion that follows will focus on a multithreading environment in which two threads, thread 0 and thread 1, are being executed concurrently, even though everything discussed herein equally applies to another multithreading environment where more than two threads are to be executed concurrently.

In this example, it is assumed that both threads 0 and 1 can contain multiple instructions and that the instructions within each thread can also be executed out of order, i.e., in an order that is different than their original program sequence. Within each thread, the original program order of the instructions can be maintained using a sequence number that corresponds to the logical sequence of the instructions in the original program order. It is further assumed that there can exist some logical dependency between different instructions within each thread and some logical dependency between different instructions across threads. More specifically, suppose that instruction INT34 in thread 1 depends on instruction INT32 in thread 1. It logically follows that the execution of INT34 in thread 1 cannot be completed until the execution of INT32 in thread 1 has been completed. Suppose also that the instruction INT34 in thread 1 also depends on the instruction INT3 in thread 0. Consequently, it follows that the execution of INT34 in thread 1 cannot be completed until the execution of INT3 in thread 0 is completed. Assuming further that instruction INT3 in thread 0 depends on instruction INT32 in thread 1. It then follows that the execution of instruction INT34 in thread 1 cannot be completed until the execution of both instruction INT3 in thread 0 and instruction INT32 has been completed. In addition, the execution of instruction INT3 in thread 0 cannot be completed until instruction INT32 in thread 1 has been completed.

Logically, in order to ensure successful completion of these instructions, INT32 in thread 1 should be executed before INT3 in thread 0 and INT3 in thread 0 should be executed before INT34 in thread 1. However, as mentioned above, both threads 0 and 1 are to be executed concurrently and the instructions within each thread can be executed out-of-order. Because of the concurrent execution between threads and out-of-order execution within each thread, it is possible that either a deadlock or a livelock situation as described above can occur. In this case, the sequence number assigned to each instruction within each thread is insufficient to resolve the deadlock or livelock situation that can arise from the dependency across threads because the sequence number alone cannot be used to tell whether INT3 should be executed before or after INT32. Likewise, the sequence number alone cannot be used to tell whether INT34 should be executed before or after INT3. In order to resolve the deadlock or livelock situation between different threads in a multithreaded processor, one of the aspects of the present invention is to introduce a concept of logical ordering or processing priority controlling between multiple threads. This concept is described in greater detail below in conjunction with FIGS. 7 and 8.

Figure 7:
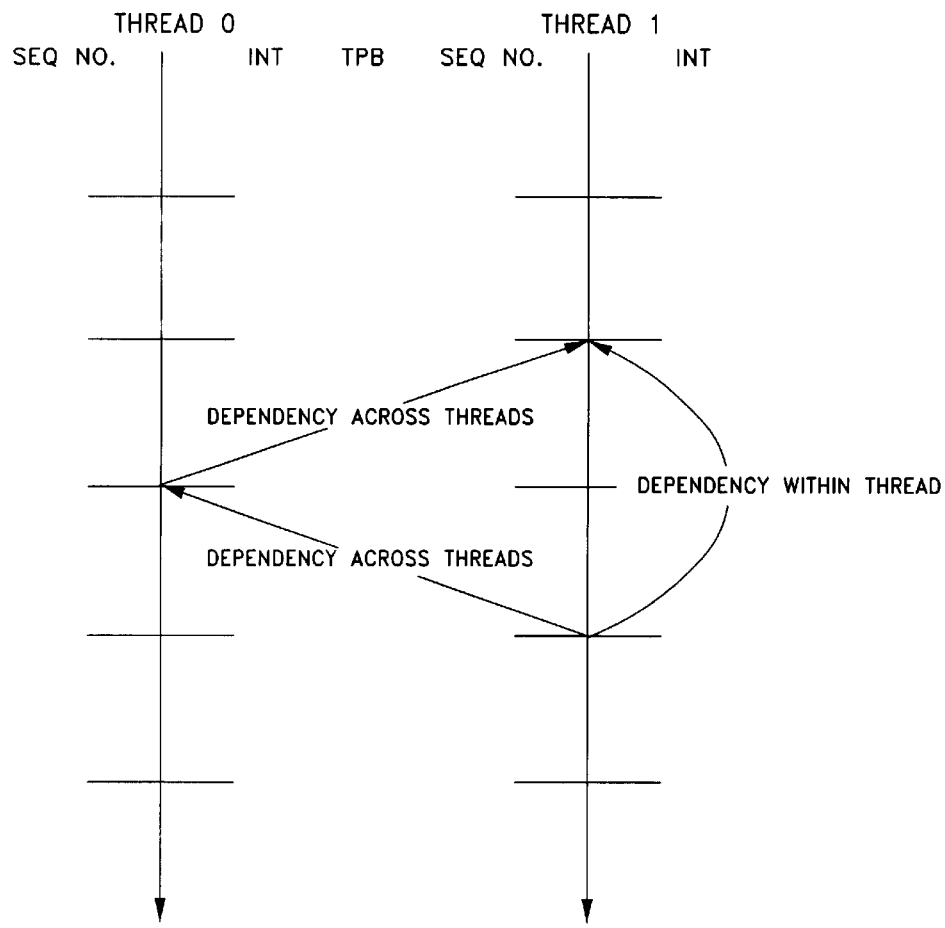
FIGS. 7 and 8 illustrate the concept of processing priority controlling between multiple threads.
Figure 8:
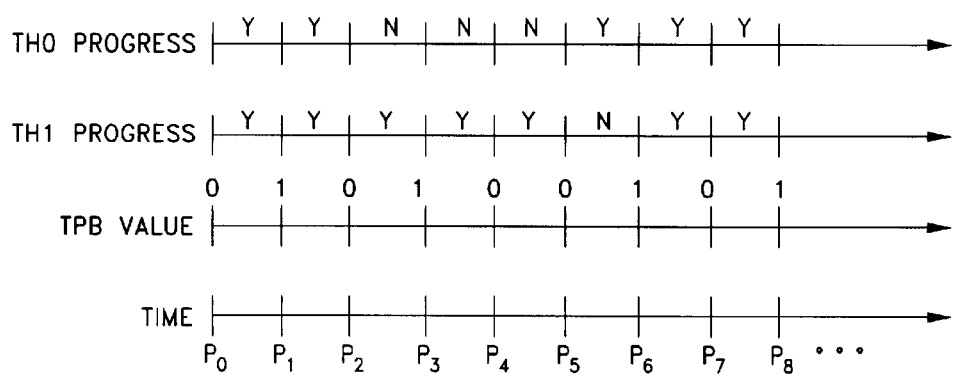

FIGS. 7 and 8 illustrate the concept of logical ordering, also referred to as processing priority controlling hereinafter, between multiple threads in a multithreaded processor. Again, for simplicity and clarity, this concept is described with respect to a multithreading environment in which two threads are executed concurrently. However, this concept is not limited to two-thread concurrent execution and should be equally applicable to any multithreading environment where more than two threads are executed concurrently.

As described above, the sequence number assigned to each instruction within each thread is insufficient to resolve a deadlock or livelock situation that can arise due to the concurrent execution of multiple threads in a multithreaded processor. Therefore it is necessary to have some logical ordering between thread 0 and thread 1 in order to resolve a deadlock or livelock situation across thread 0 and thread 1.

More specifically, if thread 0 and thread 1 happen to compete for the same resources at the same time, the processor needs to know which of the two threads should be given the priority to use the required resources before the other thread. Moreover, if one instruction in a particular thread happens to depend on another instruction in another thread, the processor also needs to know which of these two instructions should be logically executed first in order for these two instructions to be successfully completed. However, since thread 0 and thread 1 are to be executed concurrently, there is no way to tell in advance the logical dependency between thread 0 and thread 1. This is because the original program order of the instructions within one particular thread can only apply to that particular thread and not the other thread. In other words, the logical ordering between thread 0 and thread 1 can only be determined dynamically or on-the-fly based upon the progress being made within each thread. Consequently, any fixed logical ordering scheme in which one thread is always given the priority over the other thread will not work. This is because one thread, for example thread 0, may be stuck because one of its instructions depends on another instruction within the other thread, for example thread 1. In this example, if the logical ordering between threads is fixed, e.g., if the priority is always given to thread 0, then thread 0 will continue to get stuck because thread 1 will never get the priority to perform its work which in turn will get thread 0 unstuck.

In addition, an alternating logical ordering scheme in which each thread is alternately given the priority for some fixed period of time regardless of whether that period of time is sufficient for each thread to make progress will not work either. For example, assuming that thread 0 is always given the priority for N clock cycles and thread 1 is always given the priority for M clock cycle, this fixed alternating scheme will not work even though the priority is alternated between thread 0 and thread 1. This is because it is possible that thread 0 may need more than N clock cycles to get itself unstuck and thread 1 may need more than M clock cycles to get itself unstuck.

Therefore it is necessary to have a flexible and dynamic alternating priority scheme in which each thread is alternately given the priority for some sufficient period of time in order for it to make progress which in turn can help the other thread make progress. More specifically, each thread is to be alternately given the priority for some period of time initially. The initial period of time during which each thread has priority can be set according to various factors including the processing clock frequency, the average execution time of a typical instruction, the average memory latency time, the time it takes to re-execute an instruction, etc. As each thread is being executed, its progress is monitored to determine whether it is being stuck. If a particular thread, for example thread 0, has not made any progress in the period of time during which it has priority then it will be given priority for a longer duration of time the next time it has priority. This duration of time during which thread 0 is given priority will continue to increase until thread 0 makes progress. Once it is determined that thread 0 has made progress, its priority duration can be reset to some shorter period, for example the initial duration. Likewise, the duration of time during which thread 1 is given priority will continue to increase until thread 1 makes some progress at which time its priority duration can be reset to some shorter period, for example the initial duration. In short, the length of time during which each thread has priority will continue to increase until that particular thread makes some progress.

According to this dynamic and flexible alternating priority scheme, each thread is alternately given the priority for some sufficient finite time to make progress. However, one thread cannot be given priority indefinitely even if that thread is stuck. As explained above, thread 0 may be stuck because thread 1 must get something done before thread 0 can make progress. However, thread 1 may not be able to make progress unless it gets priority for some sufficient period of time. It is possible that both threads can get stuck. In this case, the time during which each thread has priority will continue to increase until some progress is made.

Referring now to FIG. 7, an indicator called thread precedence bit (TPB) is used to indicate which of the two threads 0 and 1 has priority at any given moment. A detailed description of the generation and modification of the TPB will be given below. In one embodiment, the TPB is set to one value, for example 0, to indicate that thread 0 has priority and is set to another value, for example 1, to indicate that thread 1 has priority. The TPB and the sequence number assigned to each instruction within each thread are used to indicate the logical execution order of the instructions in threads 0 and 1 if a deadlock or livelock situation occurs.

In one embodiment, each thread is considered making progress in a current processing period if it has no instructions to retire or if it has retired at least one instruction in the current processing period. If each thread is making progress, the value of the TPB is alternated between 0 and 1 every predetermined period corresponding to a duration of time during which each thread has priority. In one embodiment, the predetermined period can be set to be equal to a predetermined number of clock cycles, for example 16 clock cycles. In this example, if both threads are making progress, then the value of the TPB is alternated between 0 and 1 every 16 clock cycles. If one of the threads, for example thread 0, did not make progress that last time it had priority and also during the time after that when the other thread had priority, then the next period during which it will have priority is increased by some predetermined additional time. In one embodiment, the increment can be set to be equal to 16 clock cycles. Accordingly, thread 0 will have priority for a priority period of 32 clock cycles the next time priority is given back to it. This priority period for thread 0 will continue to increase by some predetermined additional time, for example 16 clock cycles, until thread 0 makes progress. Once thread 0 makes progress, its priority period can be reset to some predetermined number, for example, 16 clock cycles.

In the example shown in FIG. 7, the TPB is set to 0 initially at time P0 to indicate that thread 0 is to have priority for 16 clock cycles. At time P1, the TPB is set to 1 to indicate that thread 1 is to have priority for 16 clock cycles. At time P2, the TPB is switched back to 0 for another 16 clock cycles. At time P3, the TPB is alternated to 1 for 16 clock cycles. At time P4, the TPB is changed back to 0. However, this time thread 0 is to have priority for some additional time because it did not make any progress during the previous two periods between P2 and P4. Therefore, starting at P4, thread 0 is to have priority for 32 clock cycles instead of 16 clock cycles. At time P6, the TPB is then changed to 1 for 16 clock cycles. At time P7, the TPB is set to 0. This time the period for thread 0 starting at P7 is back to 16 clock cycles since thread 0 made some progress in the previous period between P6 and P7. At time P8, the TPB is changed again to 1.

Figure 9:
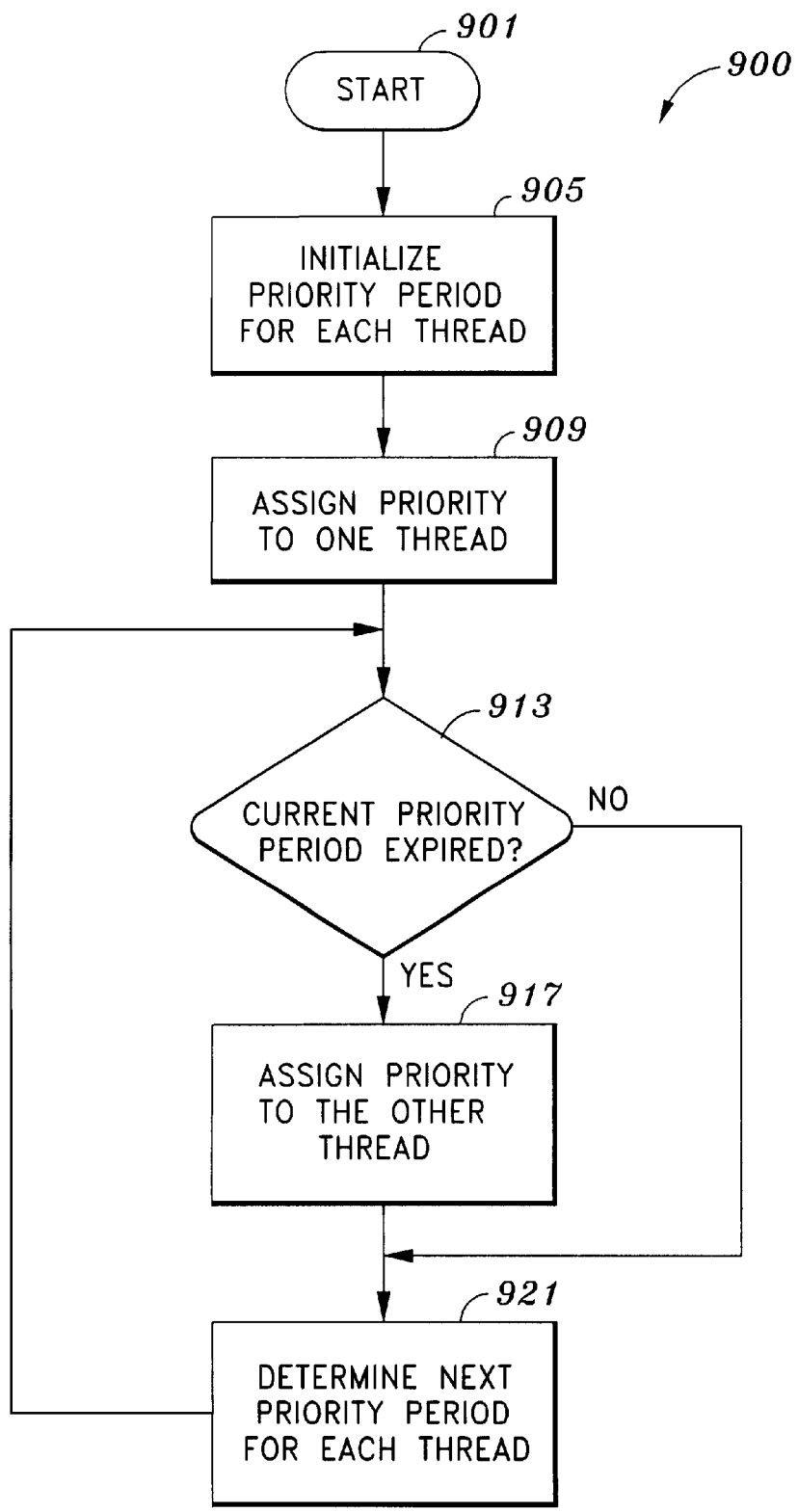
FIG. 9 shows a high-level flow diagram of one embodiment of a method for controlling the processing priority between threads.

FIG. 9 shows a high level flow diagram of one embodiment of a method 900 for controlling the processing priority between threads within a multithreaded processor. For clarity and simplicity, the method 900 is described with respect to two threads, thread 0 and thread 1, that are to be executed concurrently by the multithreaded processor, even though everything discussed herein is equally applicable to a multithreading environment having more than two threads. Similarly, the discussion and description of the method 900 also applies to a single thread environment where multiple instructions are to be executed in parallel, for example, as in a processor that implements a super-scalar architecture.

As described above, in one embodiment, the processing priority between threads is used to indicate which one of the two threads is to have priority if both threads compete for a particular resource in order to make progress. For example, if a resource A is required to execute an instruction in thread 0 and another instruction in thread 1 at the same time, then the processing priority is used as a tie breaker in this situation in order to prevent a deadlock situation. In one embodiment, the processing priority is also used to indicate the logical respective ordering of the two threads 0 and 1. As mentioned above, in a single thread environment, a sequence number is used to keep track of the logical sequence of the input instructions. This sequence number corresponds to the original sequential program order and is necessary, for example, in the situation where an in-order instruction execution is required as explained above with respect to the livelock problem. In a multithreading environment, there can be dependency across threads, as explained above, and the sequence number alone is insufficient for the processor to tell the logical sequence or order of instructions between the two threads. The processing priority is used in this case to tell the processor which thread is to have a precedent logical order with respect to the other thread.

In one embodiment, the processing priority is represented by a signal referred to as a thread precedence signal. In one embodiment, the thread precedence signal is represented by a bit called thread precedence bit. In one embodiment, the thread precedence bit is set to 0 to indicate that thread 0 is to have the processing priority and set to 1 to indicate that thread 1 is to have the processing priority, with respect to both resource usage policy and logical ordering of instruction execution.

Continuing with the present example, the method 900 starts at block 901. At block 905, the priority duration or priority period for each thread is initialized to some predetermined period. The priority duration is defined as a duration or interval of time during which a particular thread is given the processing priority. In one embodiment, the priority duration is measured in terms of processing periods where each processing period corresponds to a predetermined number of processing cycles and each processing cycle corresponds to a predetermined number of processor clock periods. In one embodiment, an initial priority duration for each thread is set to be equal to a predetermined number of clock periods, for example 16 medium clock periods. At block 909, the processing priority is given to one of the two threads for a time period corresponding to its priority duration. In one embodiment, the thread precedence bit is set to a first value, for example 0, to indicate that the processing priority is given to thread 0 and set to a second value, for example 1, to indicate that the processing priority is given to thread 1. In one embodiment, the priority duration for a particular thread starts running as soon as the processing priority is assigned to that particular thread. At decision loop 913, the method 900 proceeds to block 917 if the current priority duration has expired. At block 917, the processing priority is alternated, i.e., assigned to the other thread.

The method 900 then proceeds from either block 913 or 917 to block 921 to determine the next priority duration for each thread. The determination of the next priority period for each thread will be discussed in detail below. However, it should be noted that the next priority duration for each thread can depend on a number of factors including whether each thread has made progress within a predetermined time period, whether any specified event or interrupt has occurred in the current processing period, whether the processing priority has been alternated in the current processing period, etc. The method 900 then loops back from block 921 to decision block 913.

Figure 10:
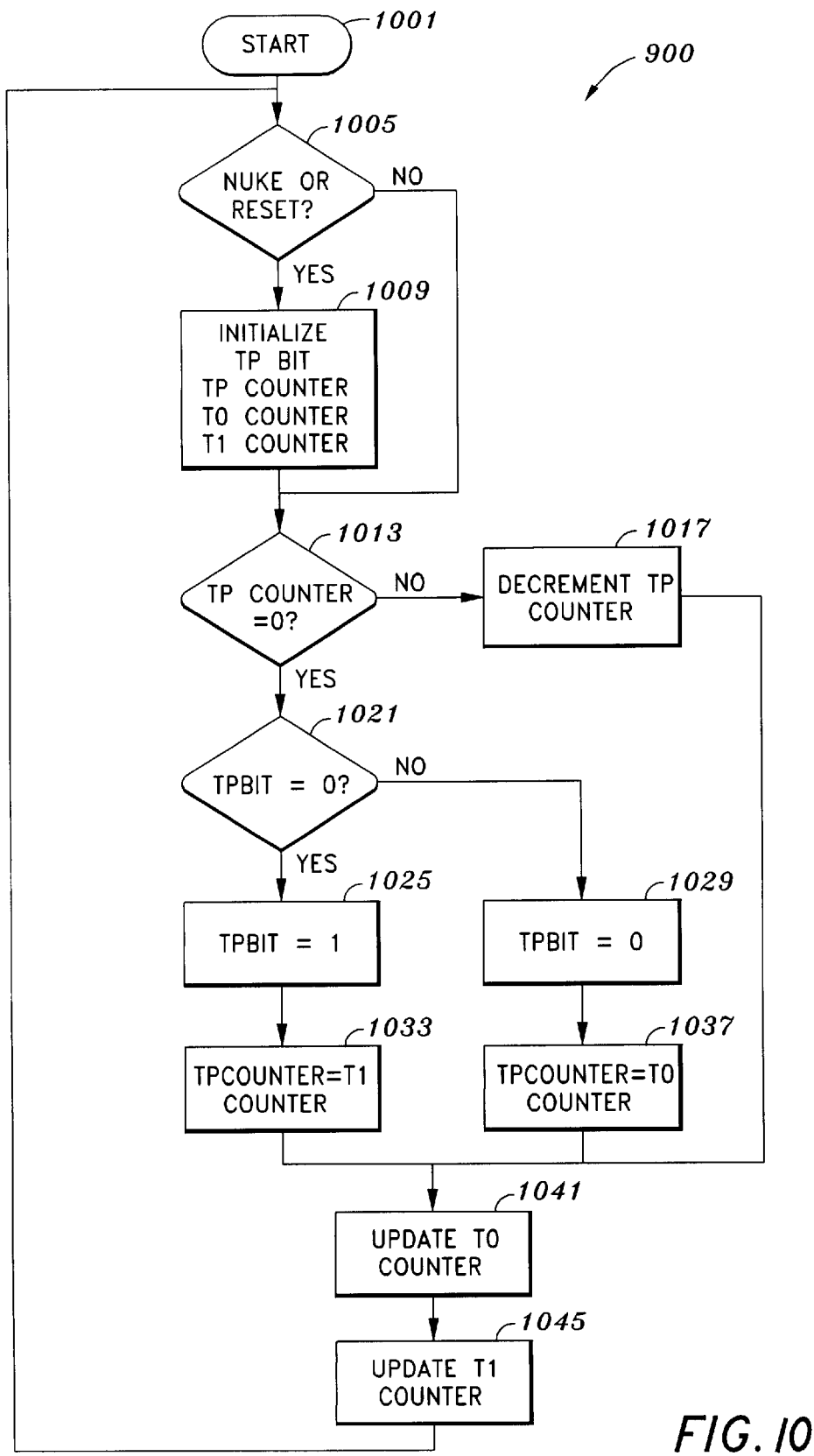
FIG. 10 illustrates a detailed flow diagram of one embodiment of a method for controlling the processing priority between threads.

FIG. 10 shows a detailed flow diagram of one embodiment of the method 900 described in FIG. 9. Again, the method 900 will be described with respect to two threads 0 and 1 even though everything described herein equally applies to a multithreading environment of more than two threads and also a single threading environment where multiple instructions are executed concurrently.

The method 900 starts at block 1001. At decision block 1005, the method proceeds to block 1009 if some specified event such as a nuke or reset has occurred. Otherwise the method proceeds to block 1013. At block 1009, the thread precedence bit (TPB) is initialized to some initial value to indicate which of the two threads 0 and 1 is to have the processing priority initially. As explained above, the TPB in one embodiment is represented by one binary bit which is set to 0 to indicate that thread 0 is having the processing priority and set to 1 otherwise. In one embodiment, for simplicity, the TPB is always set to 0 in response to a nuke or reset event. In another embodiment, the TPB can be initially set according to some predetermined scheme or based upon some predetermined criteria. For example, in response to a nuke or reset event, the TPB can be selected randomly to be either 0 or 1, or it can be set to be the same value as that prior to the nuke or reset event, or it can be inverted from the last value prior to the nuke or reset event. The two counters T0 and T1 are also initialized at block 1009 in response to the nuke or reset event. T0 counter (TC0) is used to hold a value that corresponds to a duration for which the thread 0 is given the processing priority. T1 counter (TC1) is used to hold a value that corresponds to a duration for which thread 1 is given the processing priority. Another counter, referred to as the thread precedence counter (TPC) is also loaded with an initial value. The initial value to be loaded into the TPC counter depends on whether thread 0 or thread 1 is to have the processing priority at this stage. If thread 0 is to have processing priority at this stage then the TPC counter is loaded with a value corresponding to the value contained in the TC0. If thread 1 is to have the processing priority then the TPC counter is loaded with a value corresponding to the value contained in the TC1. In one embodiment, the value contained in either the TC0 or TC1 is multiplied by a predetermined number, for example, 16 before being loaded into the TPC.

The value contained in the TPC, in one embodiment, corresponds to a number of processing periods during which T0 or T1 is given the processing priority and each processing period corresponds to a predetermined number of clock periods, for example 1 clock period. For example, assuming that thread 0 is to have the processing priority initially, then the TPB is set to 0 to indicate that thread 0 is given the processing priority initially. The content of TC0 is initialized to a predetermined number, for example 1. The content of TC1 is also initialized to a predetermined number, for example 1. In one embodiment, the content of both TC0 and TC1 are initialized to the same predetermined number, for example 1. In another embodiment, TC0 and TC1 can be initialized to different values. Continuing with the present example, the content of TC0, which is 1 in this example, is multiplied by 16 and then loaded into the TPC. In one embodiment, the TC0 and TC1 are simple binary counters having a size corresponding to a predetermined number of bits, for example 10 bits. In one embodiment, the TPC is also a simple binary counter having a predetermined size, for example, 14 bits. As a result, in one embodiment, the value contained in either TC0 or TC1 is left shifted by a predetermined number of bits, for example 4 bits, before being loaded into the TPC.

Referring back to decision block 1005, the method proceeds to block 1013 if there is no nuke or reset event detected. At decision block 1013, it is determined whether the content of the TPC has exceeded some predetermined threshold value, for example 0, which indicates that the priority duration has expired. If the priority duration has expired, the method proceeds to block 1021, otherwise it proceeds to block 1017. At block 1017, the content of the TPC is decremented by a predetermined value, for example 1. At decision block 1021, the method proceeds to block 1025 if the TPB is set to 0 for the prior priority duration, otherwise the method proceeds to block 1029. At block 1025, the TPB is set to 1. At block 1029, the TPB is set to 0. The TPC is then loaded with a number corresponding to either the TC1 value or TC0 value at blocks 1033 or 1037, respectively. In one embodiment, the content of either the TC0 or TC1 is multiplied by a predetermined number, for example 16, before being loaded into the TPC. The value stored in the TPC represents the number of clock periods during which either thread 0 or thread 1 is given the processing priority.

The method then proceeds from blocks 1033, 1037, or 1017 to block 1041 to update the content of the TC0. The content of the TC1 is updated at block 1045. The method then loops back to block 1005 to continue the processing of thread 0 and thread 1. In one embodiment, the method 900 described above is repeated once every predetermined number of processing periods, for example once every clock period. Consequently, the TPC is decremented or counted down by a predetermined count, for example 1, every clock period until the content of the TPC exceeds a predetermined threshold value, for example 0, at which time the TPB is inverted and the TPC is loaded with a new starting number corresponding to a new priority duration.

In another embodiment, the TPC is loaded with a value indicating the start of a priority duration, for example 0, and is counted up or incremented by a predetermined count, for example 1, once every processing period. In this case, the TPC is incremented or counted up until it exceeds a predetermined threshold value corresponding to the length of the priority duration, for example, the number of clock periods during which a particular thread is given the processing priority, at which time the TPB is inverted and the TPC is reset to 0. In either the counting down or counting up case, the TPC is used to keep track of the elapsed time since the start of a priority duration in order to determine whether the priority duration for a particular thread has expired.

Figure 11:
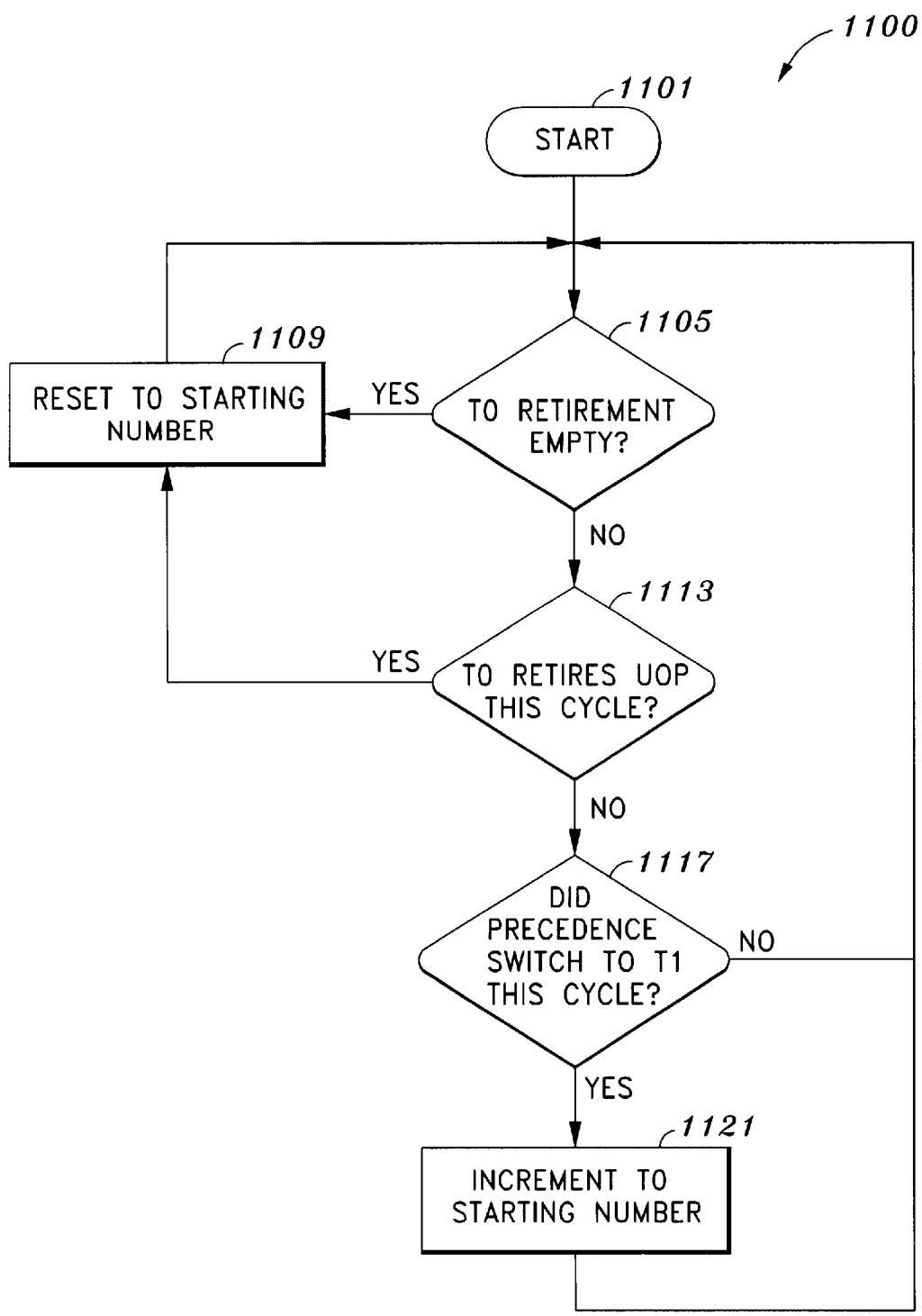
FIG. 11 is a flow diagram of one embodiment of a method for determining a priority duration for one thread.

FIG. 11 illustrates a flow diagram of one embodiment of a process for updating the content of the TC0 counter performed at block 1041 in FIG. 10. The process 1100 starts at block 1101. At decision block 1105, the process proceeds to block 1109 to reset the TC0 to some predetermined number, for example 1, if it is determined that thread 0 has no instruction to retire in the current processing cycle. Otherwise the method proceeds to block 1113. At decision block 1113, the process proceeds to block 1109 to reset the TC0 if it is determined that thread 0 has retired at least one instruction in the current processing period. Otherwise the process proceeds to block 1117. At decision block 1117, the process proceeds to block 1121 if it is determined that the processing priority has been switched from thread 0 to thread 1 in the current processing cycle and loops back to block 1105 otherwise. In one embodiment, whether the processing priority has been switched back from thread 0 to thread 1 in the current processing cycle can be determined by detecting a signal indicating that the content of the TPC has reached the predetermined threshold value in the current processing cycle and that the TPB has been inverted from 0 to 1 in the current processing cycle. The determination of whether the processing priority has been switched from thread 0 to thread 1 in the current processing cycle will be described in more detail below. At block 1121, the TC0 content is incremented by a predetermined number, for example 1. The content of the TC0, as explained above, will be used to load into the TPC to indicate how long the priority duration for thread 0 will be the next time thread 0 is given the processing priority.

Figure 12:
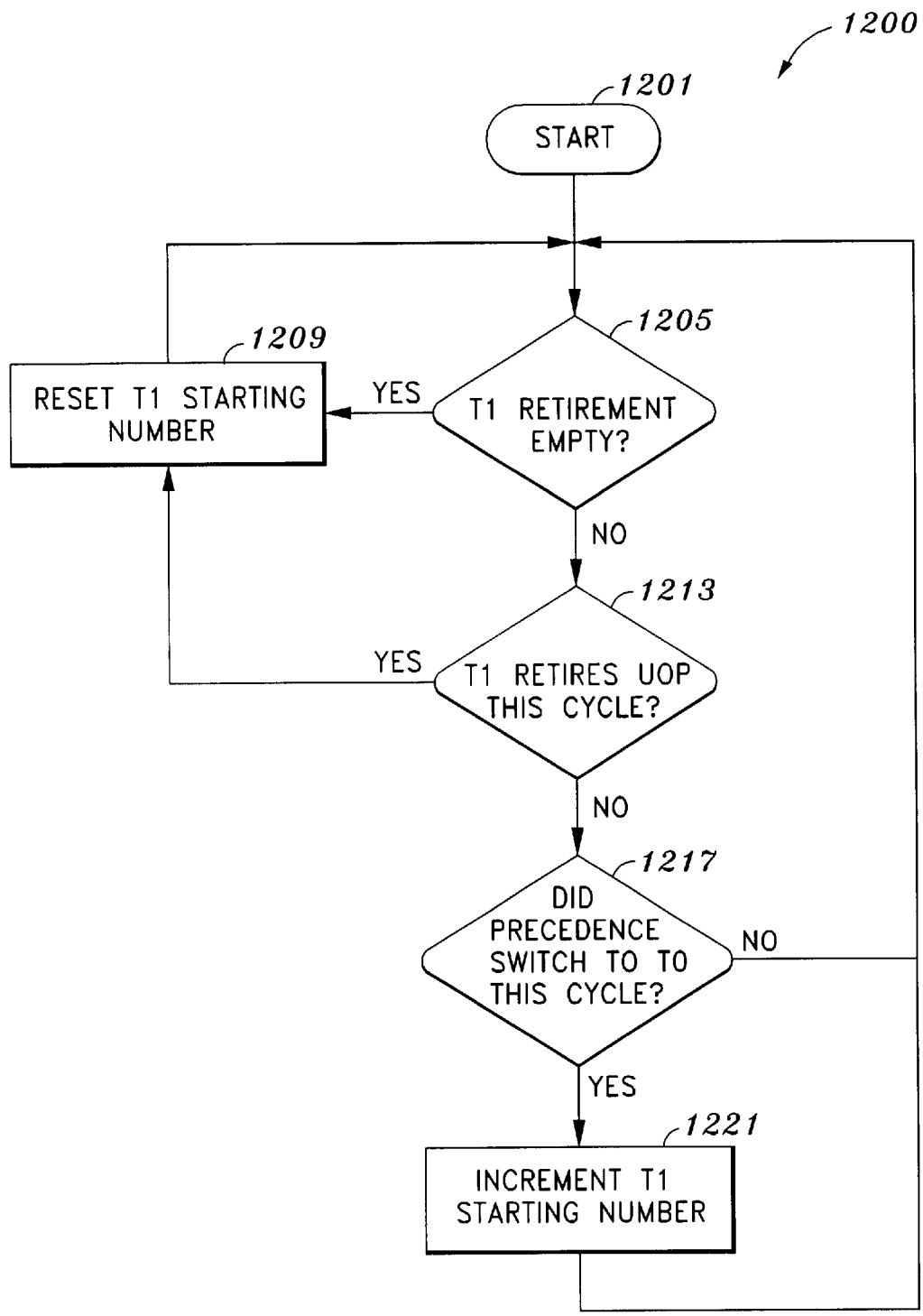
FIG. 12 is a flow diagram of one embodiment of a method for determining a priority duration for another thread.

FIG. 12 illustrates a flow diagram of one embodiment of a process for updating the content of the TC1 counter at block 1045 in FIG. 10. The process 1200 starts at block 1201. At decision block 1205, the process proceeds to block 1209 to reset TC1 to some predetermined number, for example 1, if it is determined that T1 has no instruction to retire in the current processing cycle. Otherwise the process proceeds to block 1213. At decision block 1213, the process proceeds to block 1209 to reset TC1 if it is determined that T1 has retired at least one instruction in the current processing period. Otherwise the process proceeds to block 1217. At decision block 1217, the process proceeds to block 1221 if it is determined that the processing priority has been switched from thread 1 to thread 0 in the current processing cycle and loops back to block 1205 otherwise. Whether the processing priority has been switched back from thread 1 to thread 0 in the current processing cycle, in one embodiment, can be determined by detecting a signal indicating that the content of the TPC has reached the predetermined threshold value in the current processing cycle and that the TPB has been inverted from 1 to 0 in the current processing cycle. The determination of whether the processing priority has been switched from thread 1 to thread 0 in the current processing cycle will be described in more detail below. At block 1221, the TC1 content is incremented by a predetermined number, for example 1. The content of the TC1, as explained above, will be used to load into the TPC to indicate how long the priority duration for thread 1 will be the next time thread 1 is given the processing priority.

Figure 13:
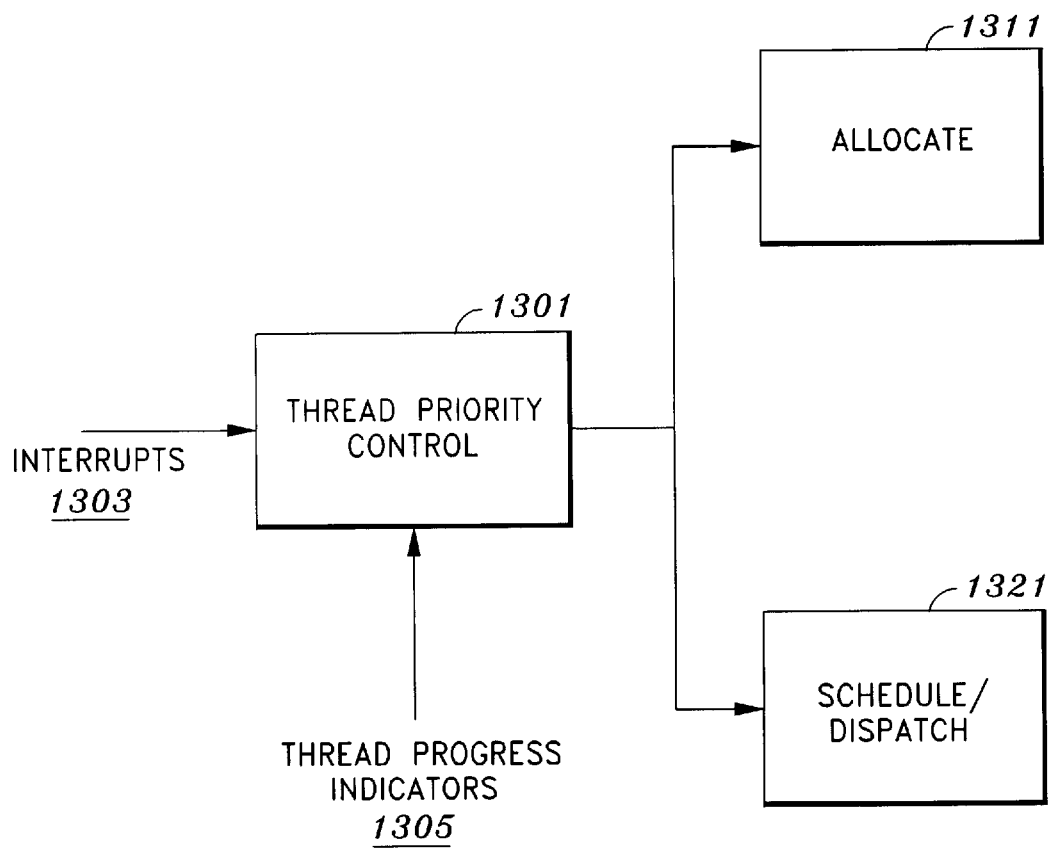
FIG. 13 is a high level block diagram of one embodiment of an apparatus for controlling the processing priority between multiple threads.

FIG. 13 shows a high level block diagram of one embodiment of an apparatus for controlling the processing priority between threads in a multithreaded processor. The thread priority control circuit 1301 receives an input signal indicating whether an interrupt, for example a nuke or reset event, has occurred in the current processing period. The thread priority circuit 1301 also receives another input signal indicating whether each thread has made progress in the current processing period. The thread priority control circuit 1301 generates a thread priority signal indicating which of the multiple threads has the processing priority in a given processing period. The thread priority signal is input to the allocate unit 1311 and the schedule/dispatch unit 1321 for these units to perform their corresponding functions. In one embodiment, the allocate unit 1311 uses the thread priority signal to determine which one of the multiple threads being executed concurrently is to be given the priority to use one or more particular processing resources if there is a resource contention between the multiple threads. Similarly, in one embodiment, the schedule/dispatch unit 1321 uses the thread priority signal to determine a logical order in which instructions in the different threads are to be executed, if necessary to resolve a livelock situation that can occur due to a dependency across threads.

Figure 14:
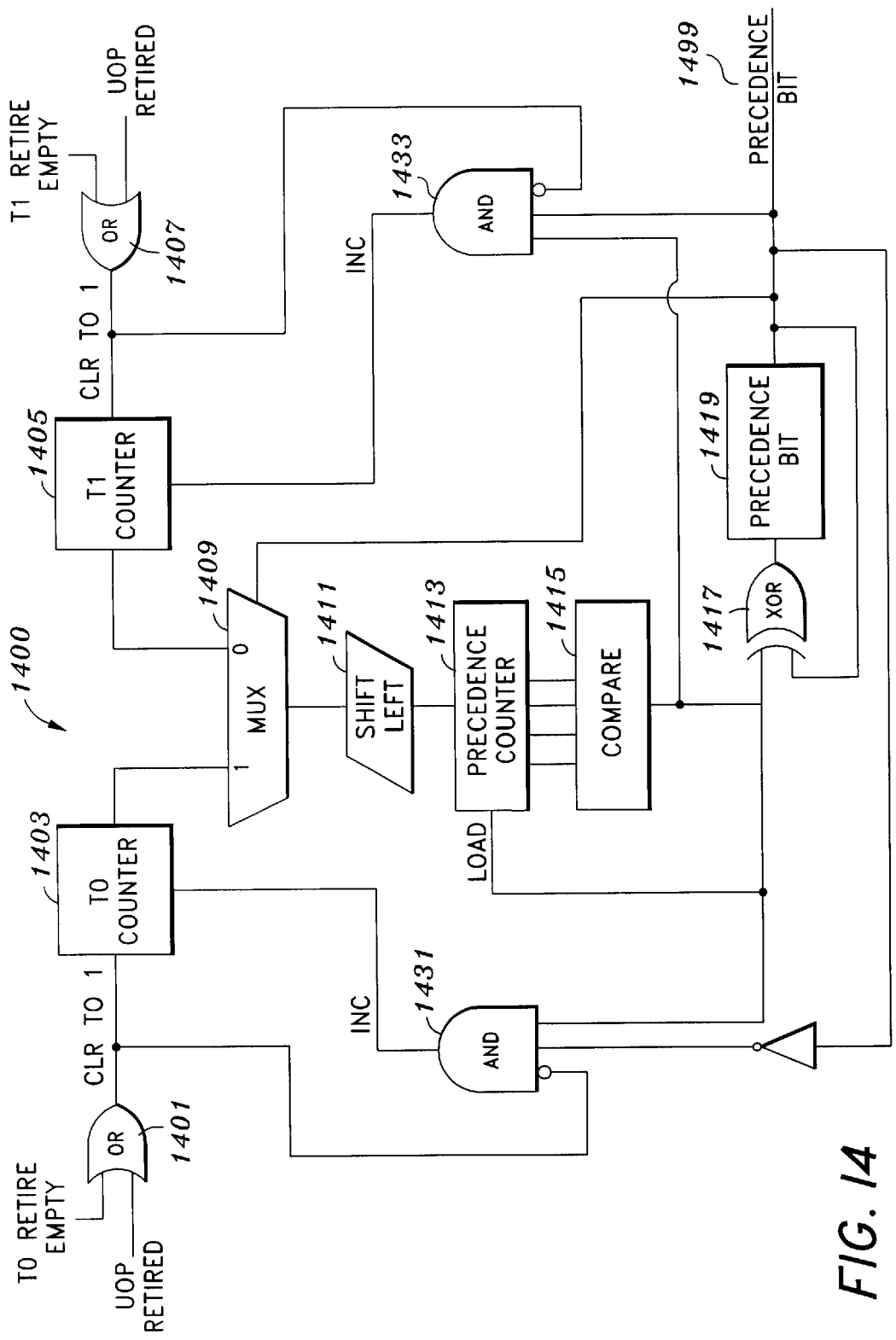
FIG. 14 is a detailed block diagram of one embodiment of an apparatus for controlling the processing priority between multiple threads.

FIG. 14 shows a block diagram of one embodiment of an apparatus for controlling the processing priority between multiple threads in a multithreaded processor. For clarity and simplicity, the discussion that follows will focus on a priority controlling scheme with respect to two threads 0 and 1. However, everything discussed herein equally applies to a multithreading environment that has more than two threads executing concurrently and also to a single thread environment where multiple instructions within one thread are executed concurrently.

As explained above, the processing priority is to be alternated between thread 0 and thread 1 periodically. The period of time during which each thread is given the processing priority depends on a number of different factors including whether some specified event has occurred, whether a particular thread is making progress, etc. However, it is essential that the processing priority is not given to one thread forever even if that particular thread is being stuck. As described above, it is possible that one thread is being stuck because of some dependency across threads. For example, thread 0 may be stuck because thread 1 must get something done before thread 0 can make progress. However, without having the processing priority for some sufficient period of time, it is possible that thread 1 cannot make progress in order to help thread 0 make progress, i.e., get thread 0 unstuck. It is entirely possible that both threads can get stuck. In this situation, the time during which each thread has the processing priority will continue to increase for both threads. More specifically, the processing priority is only given to each thread for a finite period of time in an alternating fashion.

Referring to FIG. 14, the thread precedence bit (TPB) 1499, as described above, is used to indicate which of the two threads currently has the processing priority. In one embodiment, the thread precedence bit 1499 is set to 0 to indicate that thread 0 has the processing priority and set to 1 otherwise. There are three counters, T0 counter (T0C) 1403, T1 counter (T1C) 1405, and the thread precedence counter (TPC) 1413, that are used to control the duration of time during which one of the two threads has processing priority. In one embodiment, the TPC 1413 is configured to hold a value corresponding to a number of clock periods. In one embodiment, the TPC 1413 is decremented by a predetermined count every processing period. In one embodiment, the predetermined count is one count and the processing period equals one clock period. When the TPC 1413 reaches a predetermined threshold value, for example 0, the thread precedence bit 1499 is inverted and the TPC 1413 is loaded with a new value and the counting down process is repeated. The value that gets loaded into the TPC 1413 is supplied by either the T0C 1403 or the T1C 1405 depending on whether thread 0 or thread 1 is to have the processing priority, respectively.

Initially, in response to some signal indicating that a specified event, for example a nuke event or a reset, has occurred, the thread precedence bit 1499 is either set to 0 or 1 based upon a predetermined implementation choice. In one embodiment, the thread precedence bit 1499 can be initially set to one particular value corresponding to the particular thread that is to have the initial processing priority. For example, the thread precedence bit 1499 can be initially set to 0 to indicate that thread 0 is to have the initial processing priority. In another embodiment, the thread precedence bit 1499 can be randomly selected between 0 and 1 in response to one of the specified events. The thread precedence bit 1499, in yet another embodiment, can be set to be the same value as that in the last priority duration prior to the nuke or reset. As explained earlier and below, how the thread precedence bit 1499 is set initially has little or no significance since the processing priority is to be alternated between the two threads periodically. In response to one of the specified events such as nuke or reset, both the TC0 1403 and TC1 1405 are also initialized to some predetermined starting values. In one embodiment, the TC0 1403 and the TC1 1405 are both initialized to 1. The TPC 1413 is then loaded with a value derived from either the content of the TC0 1403 or the TC1 1405 depending on the initial value of the thread precedence bit 1499. For example, if the TPB 1499 is set to 0 initially, then the value contained in the TC0 1403 is selected to compute the initial priority duration measured in terms of clock cycles. In one embodiment, the value of the TC0 1403 or TC1 1405 is multiplied by a predetermined number, for example 16, before being loaded into the TPC 1413. In one embodiment, a left shifter 1411 is used to perform the predetermined multiplication. In another embodiment, the content of the TC0 1403 or TC1 1405 is loaded directly into the TPC and is used to indicate how long the priority duration is. In one embodiment, the value contained in the TPC 1413 indicates the number of clock cycles during which a particular thread has processing priority.

Referring again to FIG. 14, the TPC 1413 is decremented by a predetermined count every processing period. In one embodiment, the predetermined count equals 1 count and the processing period equals one clock period. Accordingly, the TPC 1413 is decremented by 1 every clock cycle. The compare logic 1415 performs a comparison operation once every processing period to compare the content of the TPC 1413 with a predetermined threshold value. In one embodiment, the compare logic 1415 performs the comparison operation once every clock cycle and the predetermined threshold value is set to 0. Continuing with the present example, when the content of the TPC 1413 reaches 0, the compare logic 1415 generates a signal indicating that the prior priority duration has expired in the current processing period. The signal generated from the compare logic 1415 and the prior thread precedence bit 1499 are input into the XOR gate 1417 that causes the prior thread precedence bit 1499 to be inverted. For example, if the prior thread precedence bit 1499 is 0, then the XOR gate 1417 will invert the thread precedence bit 1499 to 1 in response to the signal generated from the compare logic 1415. The prior thread precedence bit 1499 is also input to the MUX 1409 as the select signal to select either the content of the TC0 or TC1 counter as the value for computing the duration of the new priority period. In this example, if the prior thread precedence bit is 0 (hence the new value will be 1) then the MUX 1409 selects the TC1 1405 content, otherwise the MUX 1409 selects the TC0 1403 content. The value selected by the MUX 1409 is then multiplied by a predetermined number, for example 16, by the shift logic 1411. The output from the shift logic 1411 is then loaded into the TPC 1413 in response to the signal generated from the compare logic 1415.

The contents of both T0 counter 1403 and T1 counter 1405 are updated periodically in every processing period as follows. The content of the T0 counter 1403 is either reset to a predetermined number in response to a signal generated from the OR gate 1401 or incremented by a predetermined number based upon the signal generated from the AND gate 1431. In one embodiment, if the signal from the OR gate 1401 is set then the content of the T0 counter is reset to 1. In one embodiment, if the signal from the AND gate 1431 is set then the T0 counter is incremented by 1. There are two inputs to the OR gate 1401. The first input to the OR gate 1401 is a signal indicating whether T0 has any instructions to retire in the current cycle. The first input is set to 1 if T0 has no instructions to retire in the current cycle and reset to 0 otherwise. The second input to the OR gate 1401 is a signal indicating whether T0 has retired at least one instruction in the current cycle. The second input is set to 1 if T0 has retired at least one instruction in the current cycle. Accordingly, if either the first input or the second input to the OR gate 1401 is set then T0 counter 1403 is reset to 1. In this example, if either input to the OR gate 1401 is set then T0 is making progress, i.e., not being stuck. Therefore it is not necessary to increase the priority duration for T0.

There are three different inputs to the AND gate 1431. The first input to the AND gate 1431 is the invert of the output signal from the OR gate 1401. Therefore the first input to the AND gate 1431 is only set if the output of the OR gate 1401 is low. As described above, the output of the OR gate 1401 is low means that there is no simultaneous contradictory command to clear the counter. The second input to the AND gate 1431 is the signal generated by the compare logic 1415. As described above, the signal from the compare logic 1415 stays low until the content of the TPC 1413 reaches a predetermined threshold value, for example 0. Therefore, the second input to the AND gate 1431 is only set when the TPC reaches the predetermined threshold value, i.e., when the current priority duration has expired. The third input to the AND gate 1431 is the invert of the thread precedence bit 1499. As such, the third input to the AND gate 1431 is only set if thread precedence bit is zero when the TPC 1413 reaches its threshold value. As described above, the thread precedence bit is inverted after the TPC 1413 reaches a predetermined threshold value. Accordingly, the thread precedence bit is inverted from 0 to 1 if thread 0 has prior processing priority. As a result, the third input to the AND gate 1431 is only set if the processing priority has been switched from thread 0 to thread 1 in the current processing period. Consequently, the output of the AND gate 1431 is set to increment the content of the T0 counter 1403 by a predetermined number, for example 1, if the following conditions are met. The first condition is that there is no contradictory command to clear the counter. This is indicated by the output of the OR gate 1401. The second condition is that the processing priority has been switched from thread 0 to thread 1 in the current processing period. This second condition is satisfied when the TPC counter 1413 reaches a predetermined threshold value, for example 0, and the thread precedence bit is inverted from 0 to 1.

Similarly, the content of the T1 counter 1405 is either reset to a predetermined number in response to a signal generated from the OR gate 1407 or incremented by a predetermined number based upon the signal generated from the AND gate 1433. In one embodiment, if the signal from the OR gate 1407 is set then the content of the T1 counter is reset to 1. In one embodiment, if the signal from the AND gate 1433 is set then the T1 counter is incremented by 1. There are two inputs to the OR gate 1407. The first input to the OR gate 1407 is a signal indicating whether T1 has any instructions to retire in the current cycle. The first input is set to 1 if T1 has no instructions to retire in the current cycle and reset to 0 otherwise. The second input to the OR gate 1407 is a signal indicating whether T1 has retired at least one instruction in the current cycle. The second input is set to 1 if T1 has retired at least one instruction in the current cycle. Accordingly, if either the first input or the second input to the OR gate 1407 is set then T1 counter is reset to 1. In this example, if either input to the OR gate 1407 is set then T1 is making progress, i.e., not being stuck. Therefore it is not necessary to increase the priority duration for T1.

There are three different inputs to the AND gate 1433. The first input to the AND gate 1433 is the invert of the output signal from the OR gate 1407. Therefore the first input to the AND gate 1433 is only set if the output of the OR gate 1407 is low. This means that there is no contradictory command to clear the counter. The second input to the AND gate 1433 is the signal generated by the compare logic 1415. As described above, the signal from the compare logic 1415 stays low until the content of the TPC 1413 reaches a predetermined threshold value, for example 0. Therefore, the second input to the AND gate 1433 is only set when the TPC reaches the predetermined threshold value, i.e., when the current priority duration has expired. The third input to the AND gate 1433 is the thread precedence bit 1499. As such, the third input to the AND gate 1433 is only set if thread precedence bit is set to 1 when the current priority duration expires. As described above, the thread precedence bit is inverted after the TPC 1413 reaches a predetermined threshold value. Accordingly, the thread precedence bit is inverted from 1 to 0 if thread 1 has prior processing priority. As a result, the third input to the AND gate 1433 is only set if the processing priority has been switched from thread 1 to thread 0 in the current processing period. Consequently, the output of the AND gate 1433 is set to increment the content of the T1 counter 1405 by a predetermined number, for example 1, if the following conditions are met. The first condition is that there is no contradictory command to clear the counter. This is indicated by the output of the OR gate 1407. The second condition is that the processing priority is switching from thread 1 to thread 0. This second condition is satisfied when the TPC counter 1413 reaches a predetermined threshold value, for example 0, and the thread precedence bit is about to invert from 1 to 0.

The invention has been described in conjunction with the preferred embodiment. It is evident that numerous alternatives, modifications, variations and uses will be apparent to those skilled in the art in light of the foregoing description.

What is claimed is:

1. A method of controlling a processing priority assigned alternately to a first thread and a second thread in a multi-threaded processor, the processing priority being used to prevent deadlock and livelock problems between the first thread and the second thread, the method comprising:

setting a first duration and a second duration to a first initial period of time and a second initial period of time, respectively, the first duration representing a period of priority during which the first thread is assigned the processing priority and the second duration representing a period of priority during which the processing priority is assigned to the second thread; and assigning alternately the processing priority to the first thread for the first duration and to the second thread for the second duration, the first duration being dynamically adjusted each time the processing priority is assigned to the first thread based on whether the first thread has made progress, and the second duration being dynamically adjusted each time the processing priority is assigned to the second thread based on whether the second thread has made progress.

2. The method of claim 1 wherein assigning the processing priority to the first thread comprises:

setting a thread priority signal to a first value indicating that the first thread has the processing priority over the second thread.

3. The method of claim 2 wherein the thread priority signal comprises a thread priority bit, the thread priority bit being set to a first bit value to indicate that the first thread has the processing priority and being set to a second bit value to indicate that the second thread has the processing priority.

4. The method of claim 2 further including:

setting a priority time period to indicate that the first duration during which the first thread has the processing priority has started.

5. The method of claim 4 wherein setting the priority time period comprises:

loading a priority time counter with a first number corresponding to the first duration.

6. The method of claim 1 wherein assigning the processing priority to the second thread comprises:

setting a thread priority signal to a second value indicating that the second thread has the processing priority over the first thread.

7. The method of claim 6 wherein the thread priority signal comprises a thread priority bit, the thread priority bit being set to a first bit value to indicate that the first thread has the processing priority and being set to a second bit value to indicate that the second thread has the processing priority.

8. The method of claim 6 further including:

setting a priority time period to indicate that the second duration during which the second thread has the processing priority has started.

9. The method of claim 8 wherein setting the priority time period comprises:

loading a priority time counter with a second number corresponding to the second duration.

10. The method of claim 1 further comprising:

determining whether the first thread has made progress in a current processing period; and setting the first duration to a first starting value if the first thread has made progress in the current processing period.

11. The method of claim 10 wherein determining whether the first thread has made progress in the current processing period comprises:

checking whether there is any instruction in the first thread waiting for retirement; and indicating that the first thread has made progress if there is no instruction in the first thread waiting for retirement in the current processing period.

12. The method of claim 11 wherein checking whether there is any instruction in the first thread waiting for retirement comprises:

examining a queue used to store instructions from the first thread that are waiting to be retired.

13. The method of claim 10 wherein determining whether the first thread has made progress in the current processing period comprises:

determining whether the first thread has retired at least one instruction in the current processing period; and indicating that the first thread has made progress if the first thread has retired at least one instruction in the current processing period.

14. The method of claim 10 wherein setting the first duration to the first starting value comprises:

setting a first counter to the first starting value.

15. A method of controlling a processing priority assigned alternately to a first thread and a second thread in a multithreaded processor, the processing priority being used to prevent deadlock and livelock problems between the first thread and the second thread, the method comprising:

assigning the processing priority to the first thread for a first duration, the first duration being set to a predetermined restart period of time in response to a specified event selected from a group consisting of a nuke event and a reset event;

determining whether the first duration has expired; and if the first duration has expired, assigning the processing priority to the second thread for a second duration.

16. A method of controlling a processing priority assigned alternately to a first thread and a second thread in a multithreaded processor, the processing priority being used to prevent deadlock and livelock problems between the first thread and the second thread, the method comprising:

determining a first duration, including:

updating the first duration periodically, including:

increasing the first duration by a predetermined amount based upon at least one factor selected from the group consisting of a first factor indicating whether the first thread has made progress within a predetermined time period and a second factor indicating whether the processing priority has been inverted in a current processing period;

assigning the processing priority to the first thread for the first duration;

determining whether the first duration has expired; and if the first duration has expired, assigning the processing priority to the second thread for a second duration.

17. The method of clam 16 wherein the predetermined time period comprises a time period during which the processing priority was last assigned to the first thread.

18. The method of claim 16 wherein the predetermined time period comprises a time period during which the processing priority was last assigned to the second thread.

19. The method of claim 16 wherein the predetermined time period comprises a time period during which the processing priority was last assigned to the first thread and a time period during which the processing priority was last assigned to the second thread.

20. The method of claim 16 wherein increasing comprises:

increasing the first duration by the predetermined amount if the first thread has not made progress since the last time it had the processing priority and the processing priority has been switched from the first thread to the second thread in the current processing period.

21. The method of claim 16 wherein increasing comprises:

increasing the first duration by the predetermined amount if the first thread has not made progress since the last time it had the processing priority and the processing priority has been switched from the second thread to the first thread in the current processing period.

22. The method of claim 16 wherein increasing the first duration comprises:

incrementing a first counter by the predetermined count, the predetermined count corresponding to a predetermined number of processing periods.

23. An apparatus for arbitrating a processing priority given alternately to a first thread and a second thread in a multithreaded processor, the apparatus comprising:

logic to set a first priority duration to a first initial period of time and a second priority duration to a second initial period of time, respectively, the first priority duration corresponding to a period during which the first thread is given the processing priority and the second priority duration corresponding to a period during which the second thread is given the processing priority; and logic to alternately give the processing priority to the first thread for the first priority duration and to the second thread for the second priority duration, the first priority duration being dynamically updated each time the processing priority is given to the first thread based on whether the first thread has made progress, and the second priority duration being dynamically updated each time the processing priority is given to the second thread based on whether the second thread has made progress.

24. An apparatus for arbitrating a processing priority given alternately to a first thread and a second thread in a multithreaded processor in a current processing period, the apparatus comprising:

a first circuit to determine whether a current priority period has expired and generate a change signal if the current priority period has expired, the first circuit comprising:

a priority counter to store a value indicating an amount of time that has elapsed since the current priority period starts; and a comparator to compare the value stored in the priority counter with a predetermined threshold value and to generate the change signal indicating that the current priority period has expired when the value stored in the priority counter exceeds the predetermined threshold value;

a second circuit to invert the processing priority in response to the change signal;

a first thread counter to hold a first value corresponding to a first duration during which the processing priority is to be given to the first thread;

a second thread counter to hold a second value corresponding to a second duration during which the processing priority is to be given to the second thread; and a selector to select either the output of the first thread counter or the output of the second thread counter as the length of a next priority period, the output of the selector is to be loaded into the priority counter in response to the change signal generated from the comparator indicating that the current priority period has expired, wherein the first thread counter is set to a first starting value in response to a specified event selected from the group consisting of a nuke event and a reset event.

25. The apparatus of claim 23 wherein the first priority duration is reset to a first starting value in response to a signal indicating that the first thread has made progress in the current processing period.

26. The apparatus of claim 25 wherein the first thread has made progress in the current processing period if the first thread has no instructions waiting to be retired in the current processing period.

27. The apparatus of claim 25 wherein the first thread has made progress in the current processing period if the first thread has retired at least one instruction in the current processing period.

28. An apparatus for arbitrating a processing priority given alternately to a first thread and a second thread in a multithreaded processor in a current processing period, the apparatus comprising:

a first circuit to determine whether a current priority period has expired and generate a change signal if the current priority period has expired, the first circuit comprising:
  a priority counter to store a value indicating an amount of time that has elapsed since the current priority period starts; and
  a comparator to compare the value stored in the priority counter with a predetermined threshold value and to generate the change signal indicating that the current priority period has expired when the value stored in the priority counter exceeds the predetermined threshold value;

a second circuit to invert the processing priority in response to the change signal;

a first thread counter to hold a first value corresponding to a first duration during which the processing priority is to be given to the first thread;

a second thread counter to hold a second value corresponding to a second duration during which the processing priority is to be given to the second thread; and a selector to select either the output of the first thread counter or the output of the second thread counter as the length of a next priority period, the output of the selector is to be loaded into the priority counter in response to the change signal generated from the comparator indicating that the current priority period has expired, wherein the first thread counter is incremented by a predetermined number based upon at least one factor selected from the group consisting of a first factor indicating whether the first thread has made progress after a predetermined time period has passed and a second factor indicating whether the processing priority has been alternated in the current processing period.

29. The apparatus of claim 28 wherein the first thread counter is incremented by the predetermined number if the first thread has not made progress in the current processing period and the processing priority has been alternated from the second thread to the first thread in the current processing period.

30. The apparatus of claim 28 wherein the first thread counter is incremented by the predetermined number if the first thread has not made progress in the current processing period and the processing priority has been alternated from the first thread to the second thread in the current processing period.

31. An apparatus for controlling a processing priority in a multithreaded processor capable of processing a first thread and a second thread concurrently, the apparatus comprising:

a first circuit to determine whether a first duration during which the first thread has the processing priority has expired and to generate a priority change signal if the first duration has expired;

a second circuit to invert the processing priority from the first thread to the second thread for a second duration if the first duration has expired;

a first counter to maintain a first starting number, the first starting number specifying a next priority duration for the first thread; and a second counter to maintain a second starting number, the second starting number specifying a next priority duration for the second thread, wherein the first starting number and the second starting number are updated periodically, the first starting number is incremented by a predetermined number if the first thread has not made progress in the current processing period and the processing priority has alternated in the current processing period.

32. An apparatus for managing a processing priority between a first thread and a second thread in a multithreaded processor in a current processing period, the apparatus comprising:

a first counter to store a first value corresponding to a first duration during which the first thread is to be given the processing priority;

a second counter to store a second value corresponding to a second duration during which the second thread is to be given the processing priority;

a selector to select either the first value or the second value based upon a thread priority signal indicating whether the processing priority is to be given to the first thread or the second thread;

a priority counter coupled to the selector and to store a third value indicating how much time has elapsed since the start of a current priority period, the priority counter further stores a fourth value derived from the output of the selector in response to a priority change signal;

a comparator coupled to the priority counter and to generate the priority change signal if the third value stored in the priority counter exceeds a predetermined threshold number; and invert logic coupled to the comparator and to invert the thread priority signal to alternate the processing priority in response to the priority change signal from the comparator.

33. An apparatus for controlling a processing priority in a multithreaded processor capable of processing a first thread and a second thread concurrently, the apparatus comprising:

a first circuit to determine whether a first duration during which the first thread has the processing priority has expired and to generate a priority change signal if the first duration has expired; and a second circuit to invert the processing priority from the first thread to the second thread for a second duration if the first duration has expired, the second circuit comprising:

an invert device coupled to invert a thread precedence signal to alternate the processing priority in response to the priority change signal from the first circuit, the invert device comprising:

an exclusive OR gate coupled to receive as inputs the priority change signal and the thread precedence signal and to generate the invert of the thread precedence signal.

* * * * *

UNITED STATES PATENT AND TRADEMARK OFFICE
CERTIFICATE OF CORRECTION

PATENT NO.     : 6,542,921 B1
DATED          : April 1, 2003
INVENTOR(S)    : Sager It is certified that error appears in the above-identified patent and that said Letters Patent is hereby corrected as shown below:

Column 8,
Line 64, delete "cycle", insert -- cycles --.

Signed and Sealed this

Thirtieth Day of September, 2003

JAMES E. ROGAN
*Director of the United States Patent and Trademark Office*